United States Patent
Langlinais et al.

(10) Patent No.: US 10,075,007 B2
(45) Date of Patent: Sep. 11, 2018

(54) MULTI-PHASE BATTERY CHARGING WITH BOOST BYPASS

(71) Applicant: Apple Inc., Cupertino, CA (US)

(72) Inventors: Jamie Langlinais, Cupertino, CA (US); Mark A. Yoshimoto, Cupertino, CA (US); Lin Chen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/749,470

(22) Filed: Jun. 24, 2015

(65) Prior Publication Data

US 2016/0064986 A1    Mar. 3, 2016

Related U.S. Application Data

(60) Provisional application No. 62/044,478, filed on Sep. 2, 2014.

(51) Int. Cl.
*H02J 7/00* (2006.01)
*G06F 1/26* (2006.01)
*H02M 3/158* (2006.01)

(52) U.S. Cl.
CPC ............ *H02J 7/0081* (2013.01); *G06F 1/263* (2013.01); *H02J 7/0068* (2013.01); *H02J 7/0078* (2013.01);
(Continued)

(58) Field of Classification Search
CPC .......... H02J 7/00; H02J 7/0081; H02J 7/0078; H02J 7/345; H02M 2001/009; H01M 3/158
(Continued)

(56) References Cited

U.S. PATENT DOCUMENTS

| 5,150,032 A | 9/1992 | Ho |
| 6,222,347 B1 | 4/2001 | Gong |

(Continued)

FOREIGN PATENT DOCUMENTS

| CN | 101425749 A | 6/2009 |
| CN | 103560550 A | 2/2014 |

(Continued)

OTHER PUBLICATIONS

Ming-Hsin Huang, et al., "Single-Inductor Multi-Output (SIMO) DC-DC Converters With High Light-Load Efficiency and Minimized Cross-Regulation for Portable Devices", IEEE Journal of Solid-State Circuits, vol. 44, No. 4, Apr. 1, 2009 (Apr. 1, 2009), pp. 1099-1111, XP055154034, ISSN: 0018-9200, DOI: 10.1109/JSSC.2009.2014726.

(Continued)

*Primary Examiner* — Nathaniel Pelton
*Assistant Examiner* — Dung V Bui
(74) *Attorney, Agent, or Firm* — Blank Rome LLP

(57) ABSTRACT

The disclosed embodiments provide a system that manages use of a battery in a portable electronic device. During operation, the system operates a charging circuit for converting an input voltage from a power source into a set of output voltages for charging the battery and powering a low-voltage subsystem and a high-voltage subsystem in the portable electronic device. Upon detecting the input voltage from the power source and a low-voltage state in the battery during operation of the charging circuit, the system uses a first inductor group in the charging circuit to down-convert the input voltage to a target voltage of the battery that is lower than a voltage requirement of the high-voltage subsystem. The system also uses a second inductor group in the charging circuit to up-convert the target voltage to power the high-voltage subsystem.

20 Claims, 25 Drawing Sheets

(52) U.S. Cl.
CPC ..... *H02M 3/158* (2013.01); *H02J 2007/0067* (2013.01)

(58) Field of Classification Search
USPC ....................................................... 320/134
See application file for complete search history.

(56) References Cited

U.S. PATENT DOCUMENTS

| | | | | |
|---|---|---|---|---|
| 6,329,796 | B1* | 12/2001 | Popescu | H02J 1/10 320/134 |
| 6,600,298 | B2* | 7/2003 | McDonald | H02M 3/156 323/271 |
| 6,791,853 | B2* | 9/2004 | Afzal | G06F 1/263 307/38 |
| 6,943,533 | B2* | 9/2005 | Okuno | H02M 3/1588 323/222 |
| 7,923,858 | B2 | 4/2011 | Ito | |
| 8,143,851 | B2 | 3/2012 | Greening | |
| 8,368,346 | B2* | 2/2013 | Batson | H02J 7/0045 320/103 |
| 9,209,676 | B2* | 12/2015 | Geren | H02M 1/32 |
| 9,641,079 | B2 | 5/2017 | Schmalnauer | |
| 2003/0043597 | A1 | 3/2003 | Betts-LaCroix | H02J 1/102 363/16 |
| 2005/0151509 | A1* | 7/2005 | Cook | H02J 1/00 320/116 |
| 2005/0242772 | A1 | 11/2005 | Cha | |
| 2008/0054855 | A1 | 3/2008 | Hussain | |
| 2008/0100143 | A1 | 5/2008 | Lipcsei | |
| 2009/0103341 | A1* | 4/2009 | Lee | B60W 10/26 363/124 |
| 2009/0108677 | A1 | 4/2009 | Walter | |
| 2009/0174366 | A1 | 7/2009 | Ahmad | |
| 2009/0261796 | A1 | 10/2009 | Ito | |
| 2009/0325056 | A1 | 12/2009 | Greening | |
| 2011/0121653 | A1* | 5/2011 | Hartular | H02J 1/10 307/66 |
| 2011/0234151 | A1 | 9/2011 | Uan-Zo-Li | |
| 2013/0093381 | A1* | 4/2013 | McGinley | H02J 7/0068 320/107 |
| 2013/0154550 | A1 | 6/2013 | Balmefrezol | |
| 2014/0203761 | A1* | 7/2014 | Paparrizos | H02M 3/1582 320/107 |
| 2014/0354251 | A1* | 12/2014 | Williams | H02M 3/158 323/271 |
| 2015/0097546 | A1 | 4/2015 | Pan | |
| 2015/0214770 | A1 | 7/2015 | Chen | |
| 2015/0372526 | A1 | 12/2015 | Greening | |
| 2016/0064986 | A1* | 3/2016 | Langlinais | G06F 1/263 320/134 |
| 2017/0279359 | A1 | 9/2017 | Goncalves | |

FOREIGN PATENT DOCUMENTS

| | | |
|---|---|---|
| JP | H05049179 A | 2/1993 |
| JP | H11196541 A | 7/1999 |
| JP | 2000029544 A | 1/2000 |
| JP | 2000293241 A | 10/2000 |
| JP | 2001069682 A | 3/2001 |
| JP | 2002044941 A | 2/2002 |
| JP | 2003009515 A | 1/2003 |
| JP | 2004328996 A | 11/2004 |
| JP | 2005509391 A | 4/2005 |
| JP | 2007221981 A | 8/2007 |
| JP | 2008118847 A | 5/2008 |
| JP | 2009136097 A | 6/2009 |
| JP | 2014045593 A | 3/2014 |
| KR | 1020130036691 A | 4/2013 |

OTHER PUBLICATIONS

Ozawa, H. et al., "Power Management Technology", Fujitsu-Scientific and Technical Journal, Fujitsu LTD, JP, vol. 34, No. 1, Sep. 1, 1998 (Sep. 1, 1998), pp. 68-77, XP000859887, ISSN: 0016-2523, Retrieved from the Internet: URL: www.fujitsu.com/downloads/MAG/vol34-1/paper09.pdf.

Kwon, Dongwon et al, "Single-Inductor-Multiple-Output Switching DC-DC Converters", IEEE Transactions on Circuits and Systems II: Express Briefs, IEEE, US, vol. 56, No. 8, Aug. 1, 2009, pp. 614-618, ISSN: 1549-7747.

* cited by examiner

(12) United States Patent
US 10,075,007 B2

MULTI-PHASE BATTERY CHARGING WITH BOOST BYPASS

RELATED APPLICATIONS

This application claims the benefit of U.S. Provisional Application No. 62/044,478, by inventors Jamie Langlinais, Mark A. Yoshimoto and Lin Chen, entitled "Multi-Phase Battery Charging with Boost Bypass," and filing date 2 Sep. 2014, which is incorporated herein by reference.

The subject matter of this application is related to the subject matter in a non-provisional application by inventors Thomas C. Greening, Qing Liu and William C. Athas and filed on the same day as the instant application, entitled "Battery Charging with Reused Inductor for Boost," having Ser. No. 14/749,466, and filing date 24 Jun. 2015.

BACKGROUND

Field

The disclosed embodiments relate to batteries for portable electronic devices. More specifically, the disclosed embodiments relate to techniques for performing multi-phase charging of batteries with boost bypass.

Related Art

A portable electronic device is typically configured to shut down when its battery reaches a predetermined minimum voltage, which may be higher than the lowest operating voltage of the battery. For example, although a lithium-ion battery may be considered empty when the battery voltage reaches 3.0V, certain components of the computing device (e.g., the radio and speaker subsystems of a mobile phone or tablet computer) may require a minimum voltage of 3.4V to operate, and the device may be configured to shut down at 3.4V to avoid browning out these components. As a result, the battery may contain unused capacity between 3.0V and 3.4V.

The amount of unused capacity may depend on the load current, temperature and age of the battery. For light loads on warm, fresh batteries, the unused capacity is typically just a few percent of the overall capacity. For colder or older batteries, however, the unused capacity may increase dramatically. For example, FIG. 1 shows an example of batteries discharged at a given load (0.5C load, which is the current required to discharge a battery in two hours) at two different temperatures. As shown there, discharging the battery at 25° C. may result in a few percentage of the overall capacity occurring under a cutoff voltage (shown in FIG. 1 as 3.4V), but discharging the battery at 0° C. may result in as much as 30% of the overall capacity occurring under the cutoff voltage. Accordingly, it may be desirable to have a system that is able to take advantage of this unused capacity.

SUMMARY

The disclosed embodiments provide a system that manages use of a battery in a portable electronic device. During operation, the system operates a charging circuit for converting an input voltage from a power source into a set of output voltages for charging the battery and powering a low-voltage subsystem and a high-voltage subsystem in the portable electronic device. Upon detecting the input voltage from the power source and a low-voltage state in the battery during operation of the charging circuit, the system uses a first inductor group in the charging circuit to down-convert the input voltage to a target voltage of the battery that is lower than a voltage requirement of the high-voltage subsystem. The system also uses a second inductor group in the charging circuit to up-convert the target voltage to power the high-voltage subsystem.

In some embodiments, upon detecting the input voltage from the power source and a high-voltage state in the battery, the system uses the first and second inductor groups to:

(i) down-convert the input voltage to a target voltage of the battery; and
(ii) charge the battery and power the low-voltage subsystem and the high-voltage subsystem from an input current of the power source.

In some embodiments, upon detecting the input voltage from the power source and a voltage state in the battery between the low-voltage state and a high-voltage state, the system uses the first inductor group to down-convert the input voltage to the target voltage of the battery. Next, the system powers the high-voltage subsystem from at least one of the up-converted target voltage from the second inductor group and the target voltage from the first and second inductor groups.

In some embodiments, upon detecting discharging of the battery in the low-voltage state, the system uses the second inductor group to up-convert a battery voltage of the battery to power the high-voltage subsystem, and uses the charging circuit to directly power the low-voltage subsystem from the battery voltage.

In some embodiments, upon detecting coupling of an external load to the portable electronic device, the system uses the first inductor group to up-convert the battery voltage to power the external load.

In some embodiments, during discharge of the battery between the low-voltage state and a high-voltage state, the system powers the high-voltage subsystem from at least one of the up-converted battery voltage from the second inductor group and the battery voltage along a bypass path to the high-voltage subsystem in the charging circuit.

In some embodiments, each of the first and second inductor groups includes one or more inductors.

In some embodiments, upon detecting a change between a voltage requirement of the high-voltage subsystem and a battery voltage of the battery beyond a threshold, the system switches a membership of an inductor between the first and second inductor groups to facilitate operation of the charging circuit.

In some embodiments, the operation of the charging circuit includes down-converting the input voltage, up-converting a target voltage of the battery, and/or up-converting a battery voltage of the battery.

BRIEF DESCRIPTION OF THE FIGURES

In the figures, like reference numerals refer to the same figure elements.

DETAILED DESCRIPTION

Figure 1:
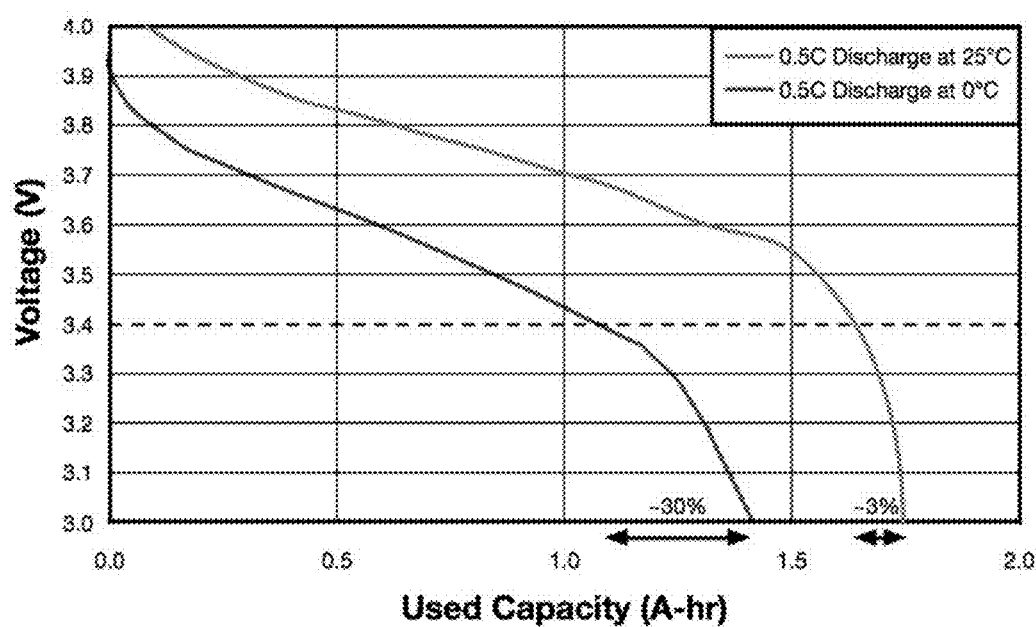
FIG. 1 shows a plot of voltage versus used capacity for a battery in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method and system for managing use of a battery in a portable electronic device. More specifically, the disclosed embodiments provide a charging circuit that may provide an up-converted voltage and/or down-converted voltage to one or more subsystems of the portable electronic device. In some instances, the charging circuit may include two or more inductor groups, each of which contains one or more inductors. In these instances, each inductor group may be used to produce a separate up-converted or down-converted voltage for use in charging the battery, powering one or more subsystems of the portable electronic device, and/or powering an external load. As a result, the charging circuit may have fewer power losses than a charging circuit that uses a single-phase converter and a linear regulator to supply power to subsystems with different voltage requirements. The use of two or more inductors may also avoid an increase in space occupied by a single, larger inductor, thereby allowing unused capacity in the battery to be accessed without exceeding a height limitation of the portable electronic device.

Figure 2:
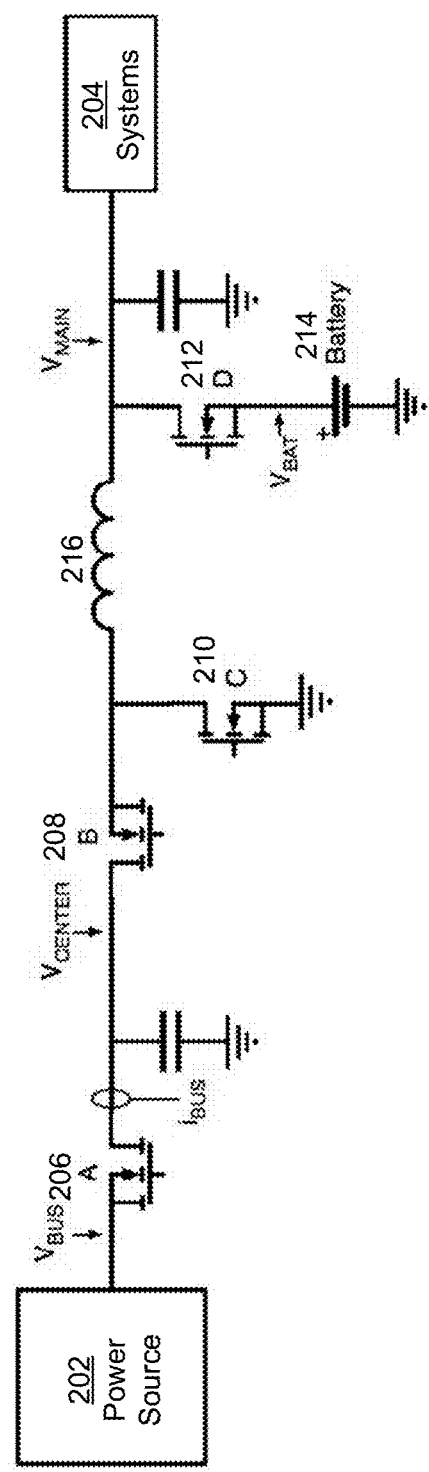
FIG. 2 shows a standard battery-charging circuit in accordance with the disclosed embodiments.

FIG. 2 shows a typical charger circuit for a system that is disabled when the system voltage drops below a minimum operating voltage, such as 3.4V. As shown there, the charger circuit may connect an intermittent power source 202 (e.g., a power adapter), a battery 214, and one or more systems 204 powered by battery 214. In some instances, the system may comprise a connector (not shown) between the intermittent power source and the charger circuit, which may allow the power source 202 to be connected to or disconnected from the charger circuit. Field-effect transistor (FET) A 206 protects against reverse voltage and prevents current from flowing from the battery to the connector (e.g., when a power adapter providing power source 202 is not connected to the system). FET B 208 and FET C 210 are alternately switching FETs that, with an inductor 216, form a buck converter that produces a bucked voltage at the output of the inductor $V_{MAIN}$. If the battery voltage is less than the minimum operating voltage (e.g., 3.4V), $V_{MAIN}$ may be controlled using the buck converter to the minimum operating voltage, and FET D 212 is controlled linearly to lower the voltage at $V_{BAT}$ to a target voltage for charging battery 214. FET D 212 is also configured to stop charging when battery 214 is full. When the battery 214 is discharging to power the one or more systems 204, FETs B 208 and C 210 stop switching, and FET D 212 is fully turned on to connect battery 214 to the one or more systems 204.

Figure 3A:
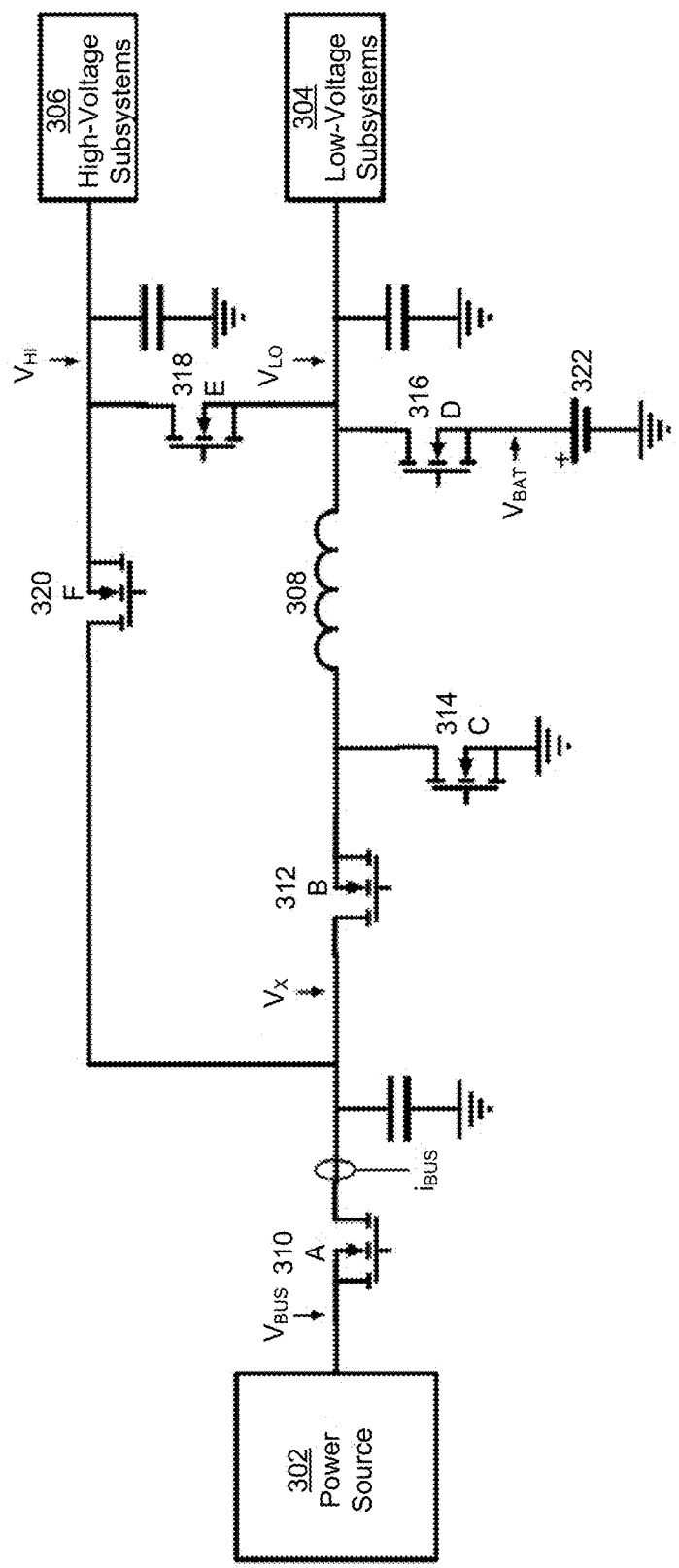
FIG. 3A shows a charging circuit for a portable electronic device in accordance with the disclosed embodiments.

FIG. 3A shows a variation of a charging circuit for a portable electronic device in accordance with the disclosed embodiments. For example, FIG. 3A may be used to supply power to components of a laptop computer, tablet computer, mobile phone, digital camera, and/or other battery-powered electronic device. In these variations, the portable electronic device may include one or more high-voltage subsystems 306 and one or more low-voltage subsystems 304, which may be powered by a battery 322. The one or more low-voltage subsystems 304 may require a first voltage that is less than a second voltage required by the one or more high-voltage subsystems 306 during operation of the portable electronic device. For example, in some variations the low-voltage subsystems 304 may require a first voltage at or below the cutoff voltage of battery 322 (e.g., 3.0 V), while the high-voltage subsystems 306 may require a second voltage above the cutoff voltage of the battery (e.g., 3.4 V). In other variations, the first voltage required by the one or more low-voltage subsystems 304 may be above the cutoff voltage of battery 322. The charging circuit may provide boost functionality, which may supply power to one or more high-voltage subsystems 306, for example, when the voltage of the battery 322 is below the second voltage. On the other hand, low-voltage subsystems 304 may require significantly less voltage than high-voltage subsystems 306 and/or the cutoff voltage of battery 322, and in some instances may be powered directly by battery 322.

For example, the majority of components in a portable electronic device, including the central processing unit (CPU), graphics-processing unit (GPU), and/or integrated circuit rails, may require voltages much less than an exemplary 3.0V cutoff voltage for battery 322. On the other hand, the radio and speaker subsystems of the portable electronic device may require an exemplary minimum voltage of 3.4V to operate. As a result, subsystems in the portable electronic device may be divided into two or more groups, such as low-voltage subsystems 304 that can be powered from 3.0V, and high-voltage subsystems 306 that require a minimum of 3.4V.

As shown in FIG. 3A, the charging circuit with boost functionality includes an inductor 308 and six FETs 310-320, and may be connected to a power source 302. FET A 310 may be turned on when an identified power source 302 is available and when disabled provides reverse voltage protection from a power source incorrectly designed or connected backwards. FET A 310 is turned off when power source 302 is not available (e.g., an external power adapter is not connected) to prevent the portable electronic device from transmitting power to either an unavailable power source 302 or to a connector where a power source may be connected. FETs B 312 and C 314 couple the input terminal of inductor 308 to a voltage node $V_X$ and a reference voltage such as ground, respectively. FETs B 312 and C 314 may be switched to selectively couple the input of inductor 308 to $V_X$ or the reference voltage. FET D 316 may couple battery 322 to a voltage node $V_{Lo}$ (which may be connected to the one or more low-voltage subsystems 304 and a load terminal of inductor 308). FET E 318 may couple the $V_{LO}$ to a voltage node $V_{HI}$ (which may be connected to the one or more high-voltage subsystems 306), or in other variations may couple $V_{HI}$ directly to battery 322. FET F 320 couples the $V_X$ to the $V_{HI}$, which may be used to couple input voltage from power source 302 and/or boosted battery voltage from inductor 308 to high-voltage subsystems 306.

Figure 3B:
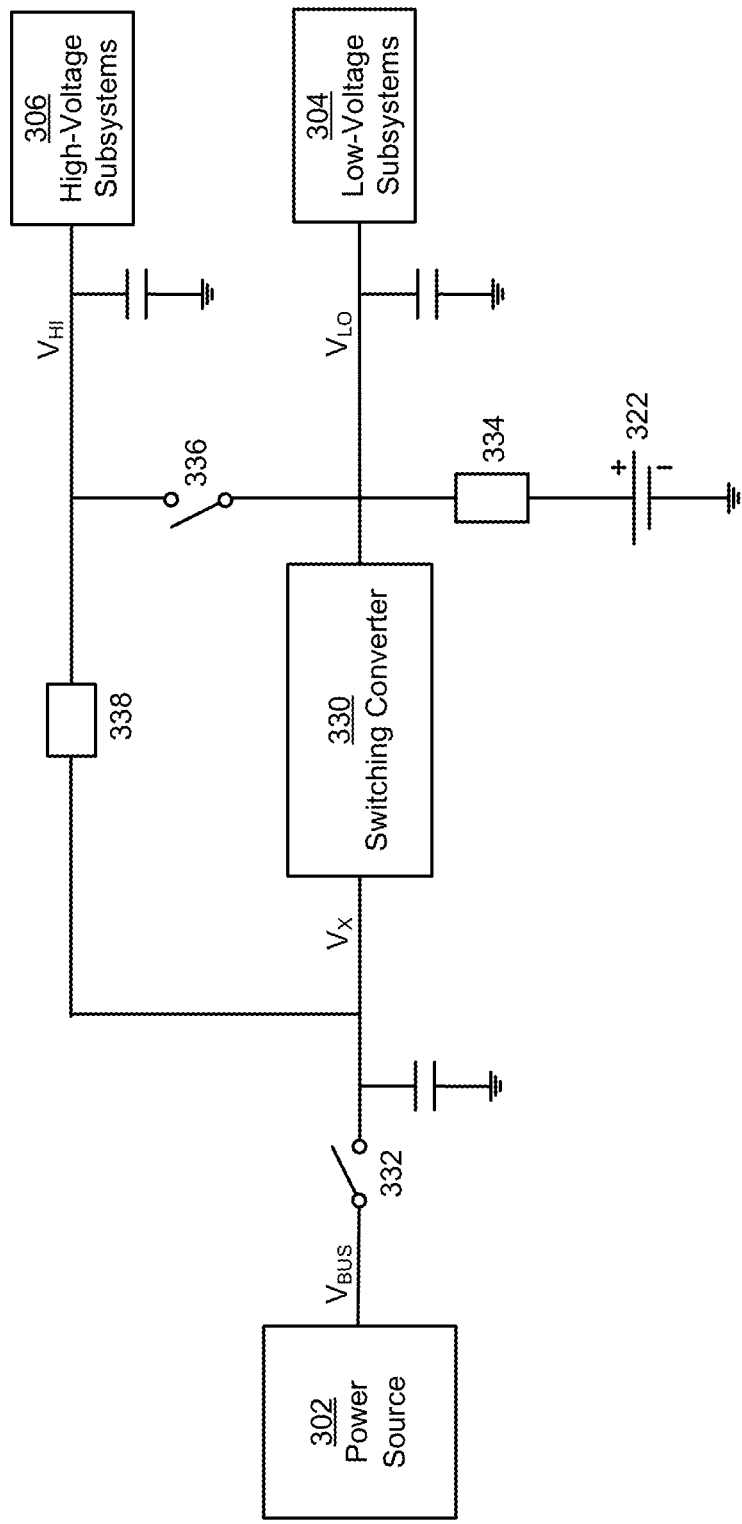
FIG. 3B shows a charging system for a portable electronic device in accordance with the disclosed embodiments.

FIG. 3B shows a charging system for a portable electronic device in accordance with the disclosed embodiments. The charging system of FIG. 3B may convert an input voltage from power source 302 and/or a battery voltage from battery 322 into a set of output voltages for charging battery 322 and/or powering one or more low-voltage subsystems 304 and one or more high-voltage subsystems 306.

As shown in FIG. 3B, the charging system includes a switching converter 330. Switching converter 330 may include one or more inductors and a set of switching mechanisms such as FETs, diodes, and/or other electronic switching components. For example, switching converter 330 may be provided by the converter shown in FIG. 3A, which includes inductor 308 with an input terminal and a load terminal and two switching mechanisms (e.g., as provided by FETs 312-314), which are configured to couple the input terminal to either a voltage node $V_X$ (which may be connected to an output of power source 302) or a reference voltage (e.g., ground), such as discussed above. The charging system may include switching mechanisms 332 and 336 and regulators 334 and 338, which collectively may be used to couple the output of switching converter 330 to either battery 322, high-voltage subsystems 306, and/or low-voltage subsystems 304 and couple power source 302 to high-voltage subsystems 306. Each switching mechanism may selectively couple different voltage nodes, and may include a switch, a FET (such as FETs 310 and 318 of FIG. 3A), a diode, or the like. Each regulator may selectively be controlled to control a voltage at one or more voltage nodes or act as a switch, and may include a FET (such as FETs 316 and 320 of FIG. 3A), a variable resistor, or the like.

For example, switching mechanism 332 may provide reverse voltage protection from an improperly functioning power source 302 (e.g., a power source with a faulty design or an incorrectly connected power source 302) and may prevent current flowing from the voltage node $V_X$ to the power source 302 (shown there as $V_{BUS}$). The switching converter 330 may couple voltage node $V_X$ with a voltage node $V_{LO}$, which may in turn be coupled to low-voltage subsystems 304. Regulator 338 may selectively couple $V_X$ with a voltage node $V_{HI}$ either directly or by linearly regulating $V_{HI}$ to a voltage less than $V_X$, which may in turn be coupled to high-voltage subsystems 306. Switching mechanism 336 may selectively couple $V_{HI}$ with $V_{LO}$, or in some instances may selectively couple $V_{HI}$ with battery 322. Regulator 334 may selectively couple $V_{LO}$ to battery 322 either directly or by linearly regulating the battery voltage to a voltage less than $V_{LO}$. The switching mechanisms may be used to control power to the high-voltage subsystems 306 and the low voltage subsystems 304, as will be described in more detail below.

Figure 3C:
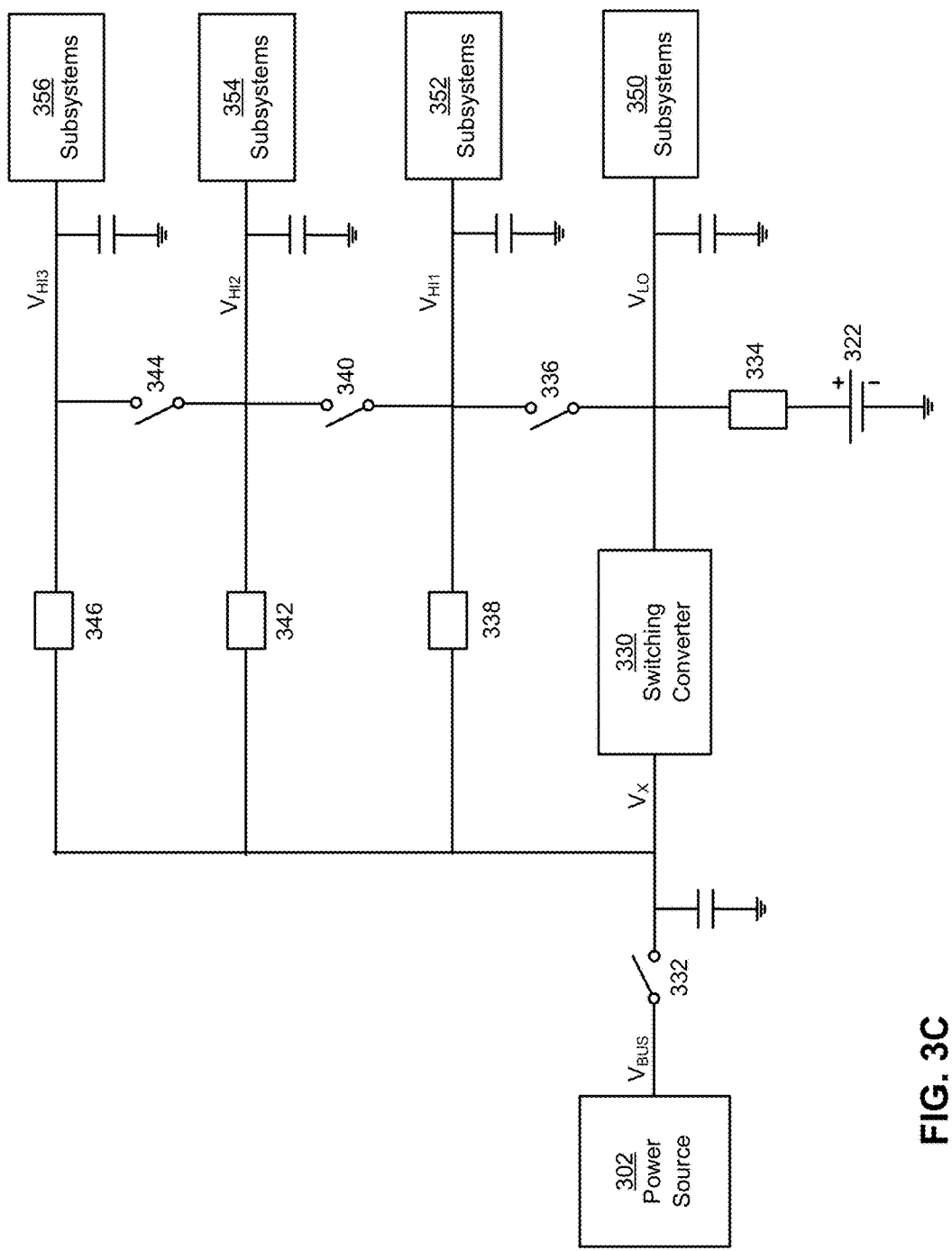
FIG. 3C shows a charging circuit for a portable electronic device in accordance with the disclosed embodiments.

FIG. 3C shows a charging circuit for a portable electronic device in accordance with the disclosed embodiments. The charging circuit may convert an input voltage from power source 302 and/or a battery voltage from battery 322 into a set of output voltages (e.g., $V_{LO}$, $V_{HI1}$, $V_{HI2}$, $V_{HI3}$) for charging battery 322 and/or powering a number of subsystems 350-356 of the portable electronic device with different voltage requirements (while shown there as having four subsystems, the charging circuit may power any number of subsystems having different voltage requirements, such as two, three, four, or five or more subsystems). For example, the charging system may power one or more subsystems with a first voltage requirement (which in some variations is at or below the cutoff voltage of battery 322 (e.g., 3.0V)), one or more subsystems with a second voltage requirement that is higher than the first voltage requirement (which may be slightly higher than the cutoff voltage of battery 322 (e.g., 3.2V)), one or more subsystems with a third voltage requirement that is higher than the second voltage requirement (e.g., 3.4V), and one or more subsystems with the highest voltage requirement in the portable electronic device (e.g., a fourth voltage requirement that is higher than the third voltage requirement, such as 3.6V).

As with the charging system of FIG. 3B, the charging system of FIG. 3C includes a switching converter 330, which may be provided by one or more inductors and a set of switching mechanisms such as FETs, diodes, and/or other electronic switching components. Specifically, switching converter 330 may be any type of bidirectional converter, such as a buck converter, a boost converter, an inverting converter, a buck-boost converter, a Ćuk converter, a single-ended primary-inductor converter (SEPIC), and/or a Zeta converter.

Additional switching mechanisms 336, 340, and 344 and regulators 334, 338, 342, and 346 may be used to couple the output of switching converter 330 to battery 322 and subsystems 350-356, power subsystems 350-356 from power source 302 and/or battery 322, and generate output voltages that meet the voltage requirements of subsystems 350-356.

Switching mechanisms 336, 340, and 344 and regulator 334 couple the output of switching converter 330 to battery 322 and subsystems 350-356. As shown in FIG. 3C, regulator 334 may selectively couple battery 322 to voltage node $V_{LO}$ (which may be connected to a load terminal of switching converter 330 and subsystems 350). Switching mechanism 336 may selectively couple voltage node $V_{LO}$ to voltage node $V_{H1}$, which in turn may be connected to subsystems 352. Switching mechanism 340 may selectively couple voltage node $V_{H1}$ to voltage node $V_{H2}$, which in turn may be connected to subsystems 354. Switching mechanism 344 may selectively couple voltage node $V_{H2}$ to voltage node $V_{H3}$, which in turn may be connected to subsystems 356. In other variations, each of switching mechanisms 336, 340, and 344 may directly connect battery 322 to subsystems 352, 354, and 356 respectively.

Regulators 338, 342, and 346 couple voltage node $V_X$ (which in turn may provide the input voltage from power source 302 and/or boosted battery voltage from switching converter 330) to subsystems 352-356, respectively, either directly or by linearly regulating to a voltage less than $V_X$. For example, as shown in FIG. 3C, regulator 338 may selectively couple voltage node $V_X$ with voltage node $V_{H1}$ and subsystem 352 either directly or by linearly regulating to a voltage $V_{H1}$ less than $V_X$. Regulator 342 may selectively couple voltage node $V_X$ with voltage node $V_{H2}$ and subsystem 354 either directly or by linearly regulating to a voltage $V_{H2}$ less than $V_X$. Regulator 346 may selectively couple voltage node $V_X$ with voltage node $V_{H3}$ and subsystem 356 either directly or by linearly regulating to a voltage $V_{H3}$ less than $V_X$.

During operation of the charging system, the system may be powered by power source 302 and/or battery 322. Similarly, battery 322 may be in a number of voltage states, including an undervoltage state, one or more low-voltage states, a high-voltage state, and/or a fully charged state. Battery 322 is considered undervoltage if the battery voltage of battery 322 is less than or equal to a designated cutoff voltage (e.g. a minimum operating voltage) of the battery (e.g., 3.0V), and battery 322 has no useful remaining charge. A low-voltage battery 322 may have a battery voltage that can be used directly by low-voltage subsystems 304 but not high-voltage subsystems 306 (e.g., between 3.0V and 3.4V). A high-voltage battery 322 may have a voltage that can be used directly by all subsystems (e.g., greater than 3.4V-3.6V), but is not yet fully charged. A fully charged battery 322 may be at the maximum voltage of battery 322 and thus cannot be charged any further. In instances where the device has three or more subsystems having different voltage requirements, such as shown in FIG. 3C, the battery may have multiple low-voltage states (e.g., a first low-voltage state where the battery voltage is high enough to power subsystems 350 but not subsystems 352-356, a second low-voltage state where the battery is high enough to power subsystems 350 and 352 but not subsystems 354 and 356, and a third low-voltage state where the battery is high enough to power subsystems 352-354 but not subsystems 356).

Figure 4A:
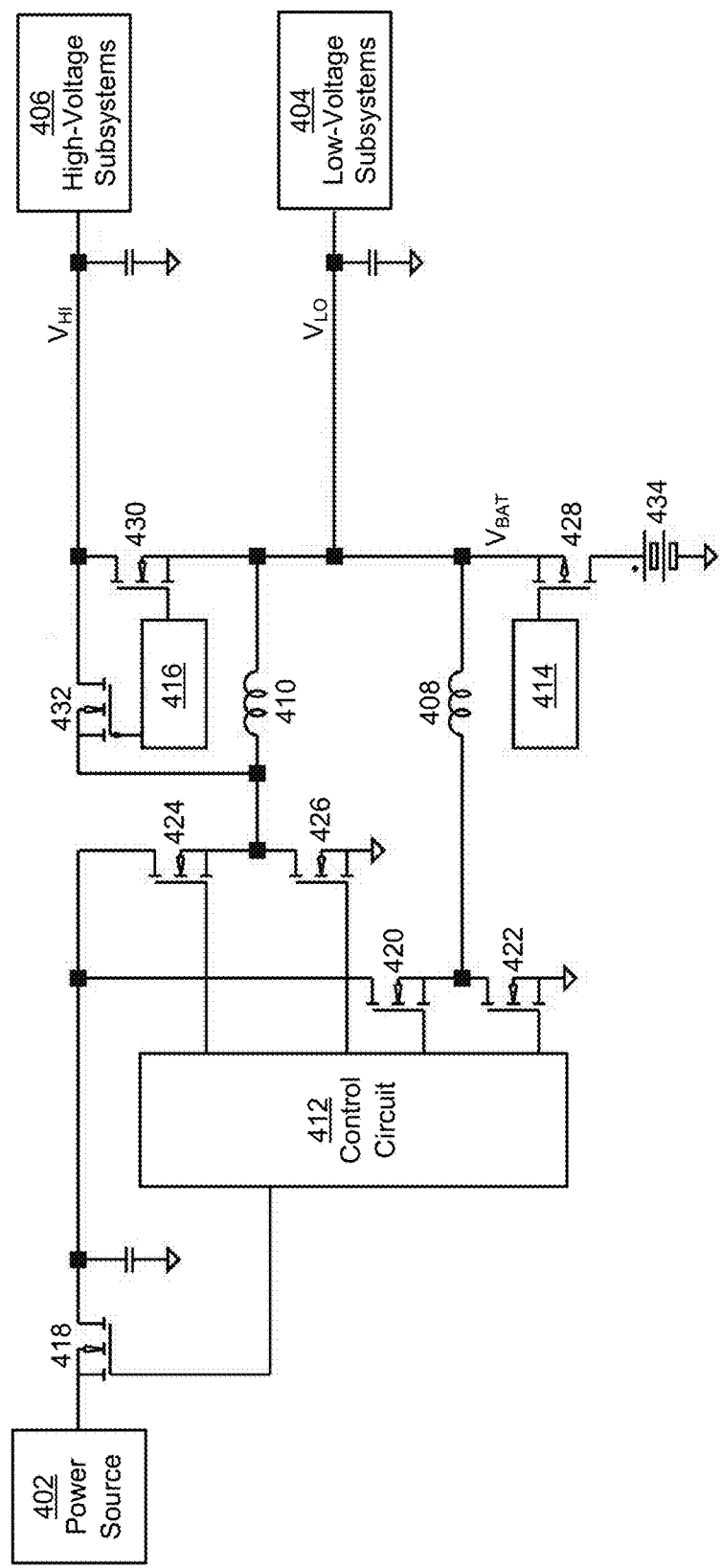
FIG. 4A shows a charging circuit for a portable electronic device in accordance with the disclosed embodiments.

FIG. 4A shows a charging circuit for a portable electronic device in accordance with the disclosed embodiments. As with the charging circuit of FIG. 3A, the charging circuit of FIG. 4A may be used to supply power to components of a portable electronic device. The portable electronic device may include one or more high-voltage subsystems 406 and one or more low-voltage subsystems 404, both of which may be powered by a battery 434. Low-voltage subsystems 404 may require a first voltage that is less than a second voltage required by high-voltage subsystems 406 during operation of the portable electronic device. For example, in some variations low-voltage subsystems 404 may require a first voltage at or below the cutoff voltage of battery 434 (e.g., 3.0 V), while high-voltage subsystems 406 may require a second voltage above the cutoff voltage of the battery (e.g., 3.4 V). In other variations, the first voltage required by the one or more low-voltage subsystems 404 may be above the cutoff voltage of battery 434.

The charging circuit may provide boost functionality, which may supply power to one or more high-voltage subsystems 406, for example, when the voltage of the battery 434 is below the second voltage. On the other hand, low-voltage subsystems 404 may require significantly less voltage than high-voltage subsystems 406 and/or the cutoff voltage of battery 434, and in some instances may be powered directly by battery 434.

Unlike the charging circuit of FIG. 3A, the charging circuit of FIG. 4A may provide both boost and buck functionality at the same time. As shown in FIG. 4A, the charging circuit with both boost and buck functionality includes two inductors 408-410 and eight FETs 418-432. The operation of FETs 418-426 may be controlled by a first control circuit 412, the operation of FET 428 may be controlled by a second control circuit 414, and the operation of FETs 430-432 may be controlled by a third control circuit 416. Control circuit 412 may use FETs 420-426 and inductors 408-410 to buck and/or boost voltages in the charging circuit. Control circuit 414 may use FET 428 to connect or disconnect battery 434 to the charging circuit, thus enabling or disabling the charging or discharging of battery 434 through the charging circuit. Control circuit 416 may use FETs 430-432, along with FET 424 controlled by control circuit 412, to direct current to high-voltage subsystems 406 through a boost path that performs up-converting of a battery voltage and/or target voltage $V_{BAT}$ through inductor 410 and FETs 426 and 432 or a bypass path that supplies the battery or target voltage directly to high-voltage subsystems 406. The charging circuit may also be connected to a power source 402 such as a power adapter, which supplies an input voltage for charging battery 434 and/or powering low-voltage subsystems 404 and high-voltage subsystems 406.

FET 418 may be turned on when power source 402 is available and disabled to provide reverse voltage protection from an incorrectly designed and/or connected power source. FET 418 may also be disabled when power source 402 is not available (e.g., an external power adapter is not connected) to prevent the portable electronic device from transmitting power to an unavailable power source 402 and/or to a connector where a power source may be connected. FETs 420 and 422 couple the input terminal of inductor 408 to the input voltage and a reference voltage such as ground, respectively. FETs 424 and 426 couple the input terminal of inductor 410 to the input voltage and the reference voltage, respectively. FET 428 may couple battery 434 to the load terminals of inductors 408-410 and low-voltage subsystems 404. FET 430 may couple the load terminal of inductor 410 to high-voltage subsystems 406 along a bypass path from battery 434 to high-voltage subsystems 406, while FET 432 may couple the input terminal of inductor 410 along a boost path from battery 434 to high-voltage subsystems 406.

The inclusion of two inductors 408-410 in the charging circuit may allow the charging circuit to provide a multiple-phase switching converter that can independently buck the input voltage from power source 402 (if power source 402 is available) into a target voltage of battery 434 and boost the target voltage into an output voltage $V_{HI}$ for powering high-voltage subsystems 406. If power source 402 is not available and battery 434 is discharging, the control circuit may use the multiple-phase switching converter to boost the battery voltage of battery 434 into one or more output voltages for powering high-voltage subsystems 406 and/or an external load. Inductors 408-410 may also occupy less height than a single, larger inductor that may be used to produce the same current. The operation of the charging circuit is described in further detail below with respect to FIGS. 4B-4F.

Because the charging circuit does not linearly operate FETs 418-432, the charging circuit may have significantly lower power losses than the charging circuit of FIG. 3A. For example, the linear operation of FET F 320 in the charging circuit of FIG. 3A may incur a power dissipation of the output current multiplied by the difference between $V_X$ and $V_{HI}$. The proportional increase of the power dissipation with $V_X$ and the resultant thermal dissipation from linear operation of FET F 320 may prevent charging at higher voltages and/or currents until battery 322 has reached a battery voltage that is sufficient to directly power high-voltage subsystems 306. In turn, the charging circuit of FIG. 3A may not be suitable for use with portable electronic devices that use higher input voltages, large loads on the high-voltage subsystem rail, and/or larger batteries. Whereas, the power loss associated with boosting the battery voltage of battery 434 into an output voltage for powering high-voltage subsystems 406 may primarily include the conduction losses and/or switching losses of inductor 410, FETs 424-426 and 432, and/or other components along a boost path from battery 434 to high-voltage subsystems 406. As a result, the charging circuit of FIG. 4A may provide faster charging and/or lower power and thermal dissipation than the charging circuit of FIG. 3A.

Figure 4B:
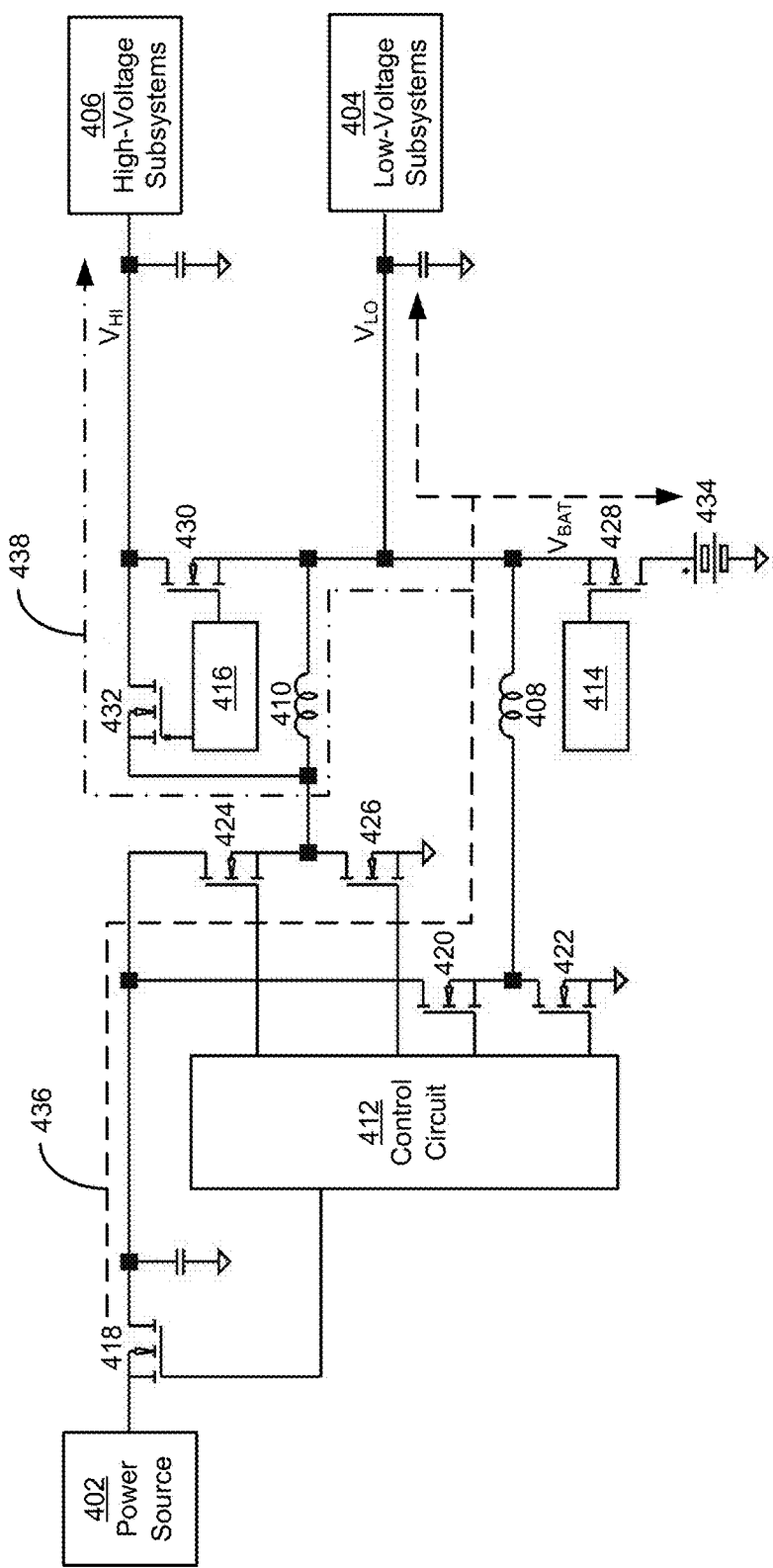
FIG. 4B shows the operation of a charging circuit for a portable electronic device in accordance with the disclosed embodiments.

FIG. 4B shows the operation of a charging circuit for a portable electronic device in accordance with the disclosed embodiments. More specifically, FIG. 4B shows the operation of the charging circuit of FIG. 4A during charging of battery 434 in a low-voltage state. In the low-voltage state, battery 434 may have a battery voltage that can be used directly by low-voltage subsystems 304 but not high-voltage subsystems 306 (e.g., between 3.0V and 3.4V).

To charge battery 434, an input voltage and input current may be supplied from power source 402, and FETs 418 and 428 may be enabled to couple power source 402 and battery 434, respectively, to the charging circuit. The input current may be supplied to battery 434 along a buck path 436 that includes FETs 418-420 and 428 and inductor 408. Control circuit 412 may use FETs 420-422 and inductor 408 to down-convert the input voltage into a target voltage $V_{BAT}$ of battery 434 that is lower than the voltage requirement of high-voltage subsystems 406. The same target voltage may be used to power low-voltage subsystems 404. For example, control circuit 412 may switch FETs 420-422 on and off in complementary fashions as part of a servomechanism feedback loop that controls both $V_{BAT}$ and $V_{LO}$ to the target voltage of battery 434. Control circuit 414 may turn FET 428 on to enable charging of battery 434 from the input current and target voltage.

To power high-voltage subsystems 406, the input current may be supplied to high-voltage subsystems 406 along a boost path 438 that includes inductor 410 and FET 432. To cause current to flow in the "reverse" direction along boost path 438, control circuit 416 may turn FET 430 off and FET 432 on. In addition, control circuit 412 may use FETs 426 and 432 and inductor 410 to up-convert the target voltage of battery 434 to $V_{HI}$, which is used to power high-voltage subsystems 406. For example, control circuit 412 may turn FET 424 off to direct current flow in the reverse direction across inductor 410 to high-voltage subsystems 406. Control circuit 412 may additionally switch FETs 426 and 432 on and off in complementary fashions as part of another servomechanism feedback loop that controls the input terminal of inductor 410 and $V_{HI}$ to at or above the voltage requirement of high-voltage subsystems 406 (e.g., 3.4V or higher).

Figure 4C:
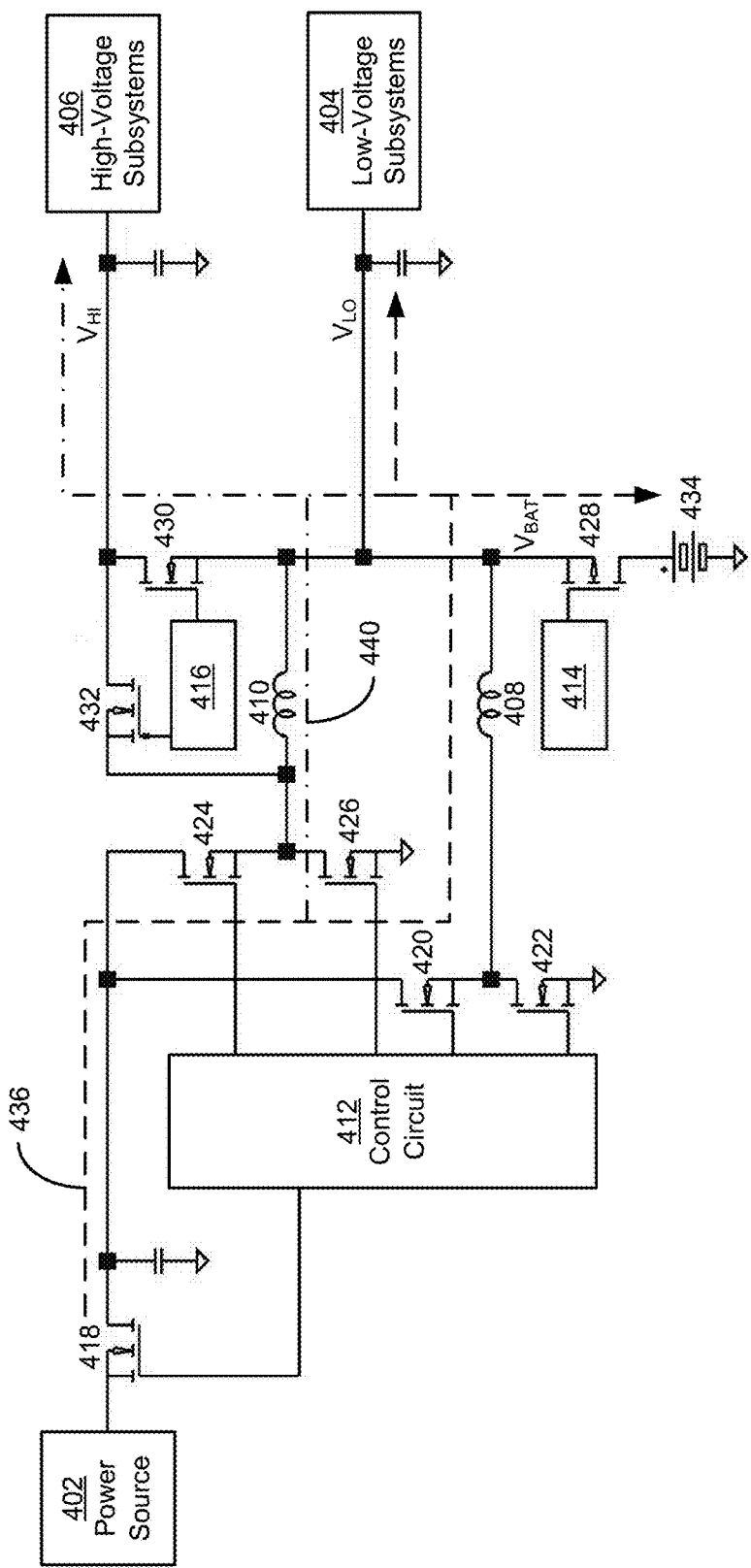
FIG. 4C shows the operation of a charging circuit for a portable electronic device in accordance with the disclosed embodiments.

FIG. 4C shows the operation of a charging circuit for a portable electronic device in accordance with the disclosed embodiments. More specifically, FIG. 4C shows the operation of the charging circuit of FIG. 4A during charging of battery 434 in a high-voltage state. In the high-voltage state, battery 322 may have a voltage that can be used directly by all subsystems (e.g., greater than 3.4V-3.6V), but is not yet fully charged.

As with FIG. 4B, an input voltage and input current may be supplied from power source 402, and FETs 418 and 428 may be enabled. FET 428 may subsequently be configured to stop charging once battery 434 reaches a fully charged state to discontinue charging of battery 434. The input current may be supplied to battery 434 along buck path 436, which includes FETs 418-420 and 428 and inductor 408. Control circuit 412 may use FETs 420-422 and inductor 408 to down-convert the input voltage into a target voltage of battery 434 $V_{BAT}$, which is at or above the voltage requirement of high-voltage subsystems 406. For example, control circuit 412 may alternately switch FETs 420-422 on and off as part of a servomechanism feedback loop that produces the target voltage at the load terminal of inductor 408. As a result, both low-voltage subsystems 404 and high-voltage subsystems 406 may be powered directly by the target voltage of battery 434.

Control circuit 412 may also provide additional input current along a second buck path 440 that includes inductor 410 and FETs 424 and 430. In other words, control circuit 412 may also use FETs 424-426 and inductor 410 to down-convert the input voltage into the target voltage of battery 434. For example, control circuit 412 may alternately switch FETs 424-426 on and off as part of a servomechanism feedback loop that produces the target voltage at the load terminal of inductor 410. The target voltage and input current from both paths 436 and 440 may then be used to charge battery 434 and power low-voltage subsystems 404 and high-voltage subsystems 406.

To prevent current from flowing in the reverse direction across inductor 410, control circuit 416 may turn FET 432 off. Control circuit 416 may turn FET 430 on to direct the input current to high-voltage subsystems 406 from the load terminals of inductors 408-410.

During charging of battery 434 that is between the low-voltage state and high-voltage state (e.g., 3.4V to 3.6V), the charging circuit may alternate between using paths 438 and 440 to power high-voltage subsystems 406. In other words, the charging circuit may power high-voltage subsystems 406 from the up-converted target voltage from inductor 410, FET 426, and/or path 438, or the charging circuit may power high-voltage subsystems 406 directly from the target voltage of battery 434 along path 440, which bypasses boosting of the target voltage. Such switching between boost and bypass modes may facilitate efficient operation of the charging circuit by allowing the charging circuit to respond to current and/or load transients. For example, a current transient on high-voltage subsystems 406 may cause momentary periods in which powering high-voltage subsystems 406 along path 440 is more efficient than boosting the target voltage through path 438. As a result, the charging circuit may include functionality to detect current transients on high-voltage subsystems 406 and select the most efficient path 438-440 for powering high-voltage subsystems 406 in response to the current transients.

Figure 4D:
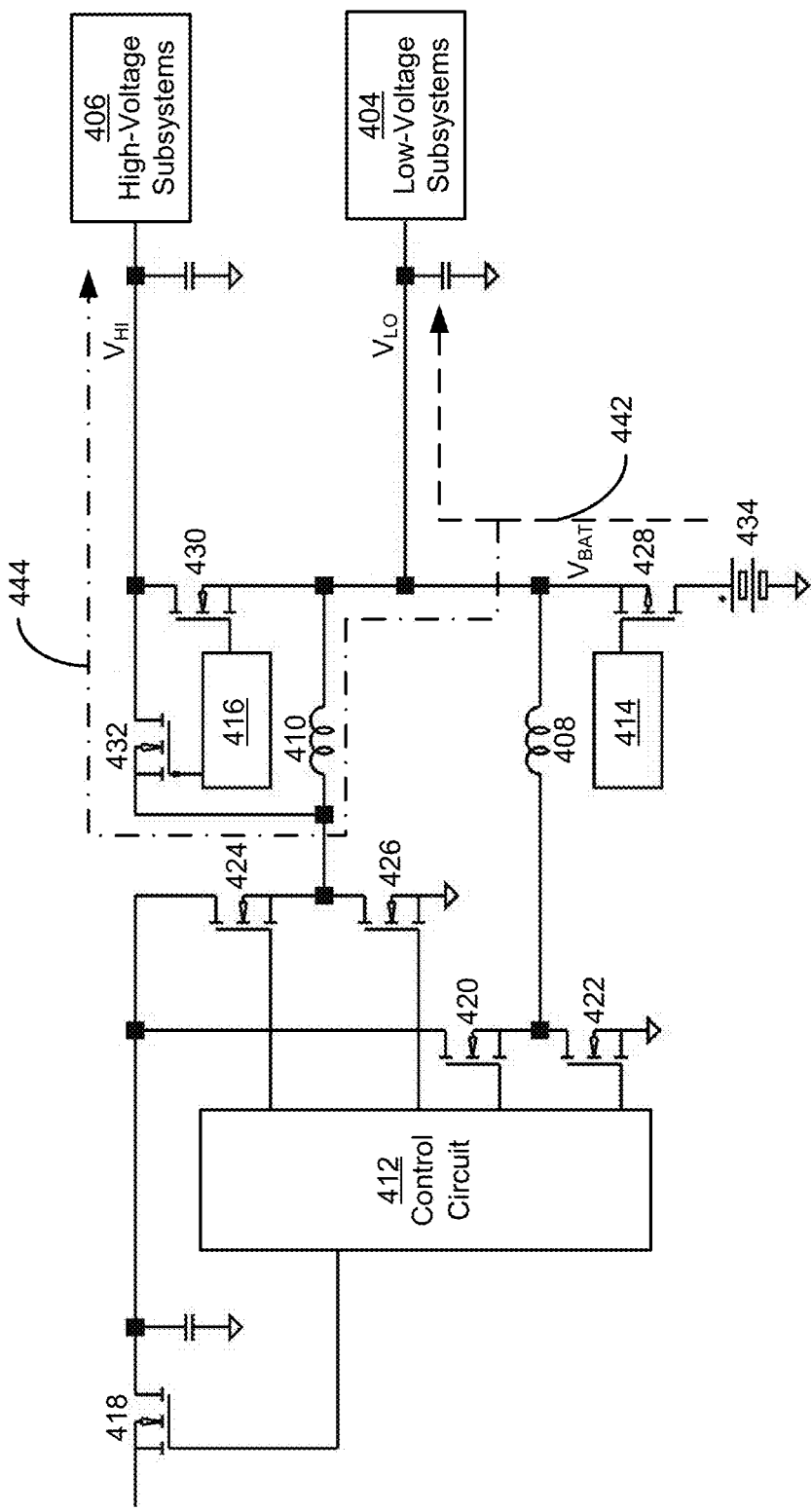
FIG. 4D shows the operation of a charging circuit for a portable electronic device in accordance with the disclosed embodiments.

FIG. 4D shows the operation of a charging circuit for a portable electronic device in accordance with the disclosed embodiments. In particular, FIG. 4D shows the operation of the charging circuit of FIG. 4A during discharging of battery 434 in a low-voltage state. In the low-voltage state, battery 434 may have a battery voltage that can be used directly by low-voltage subsystems 304 but not high-voltage subsystems 306 (e.g., between 3.0V and 3.4V).

Because battery 434 is discharging, an input voltage from power source 402 is not available. In turn, control circuit 412 may disable FETs 418-422 to prevent current from battery 434 from flowing to an unavailable and/or improperly connected power source 402. The battery voltage of battery 434 may be used to directly power low-voltage subsystems 404 along a path 442 that includes FET 428, which is enabled to allow discharging of battery 434. FET 428 may subsequently be configured to stop charging once the cutoff voltage of battery 434 is reached to discontinue discharging of the battery. More specifically, once the battery has discharged to the cutoff voltage, all FETs 418-432 may be switched off until power source 402 is detected.

During discharge of battery 434 in the low-voltage state, the battery voltage of battery 434 may not be sufficient to directly power high-voltage subsystems 406. Instead, the battery voltage may be boosted along a boost path 444 that includes inductor 410 and FET 432. To cause current to flow in the "reverse" direction along boost path 444, control circuit 416 may turn FET 430 off and FET 432 on. In addition, control circuit 412 may use FETs 426 and 432 and inductor 410 to up-convert the battery voltage to $V_{HI}$, which is used to power high-voltage subsystems 406. For example, control circuit 412 may turn FET 424 off to direct current flowing in the reverse direction across inductor 410 to high-voltage subsystems 406. Control circuit 412 may alternately switch FETs 426 and 432 on and off as part of a servomechanism feedback loop that controls the input terminal of inductor 410 and $V_{HI}$ to at or above the voltage requirement of high-voltage subsystems 406 (e.g., 3.4V or higher).

Figure 4E:
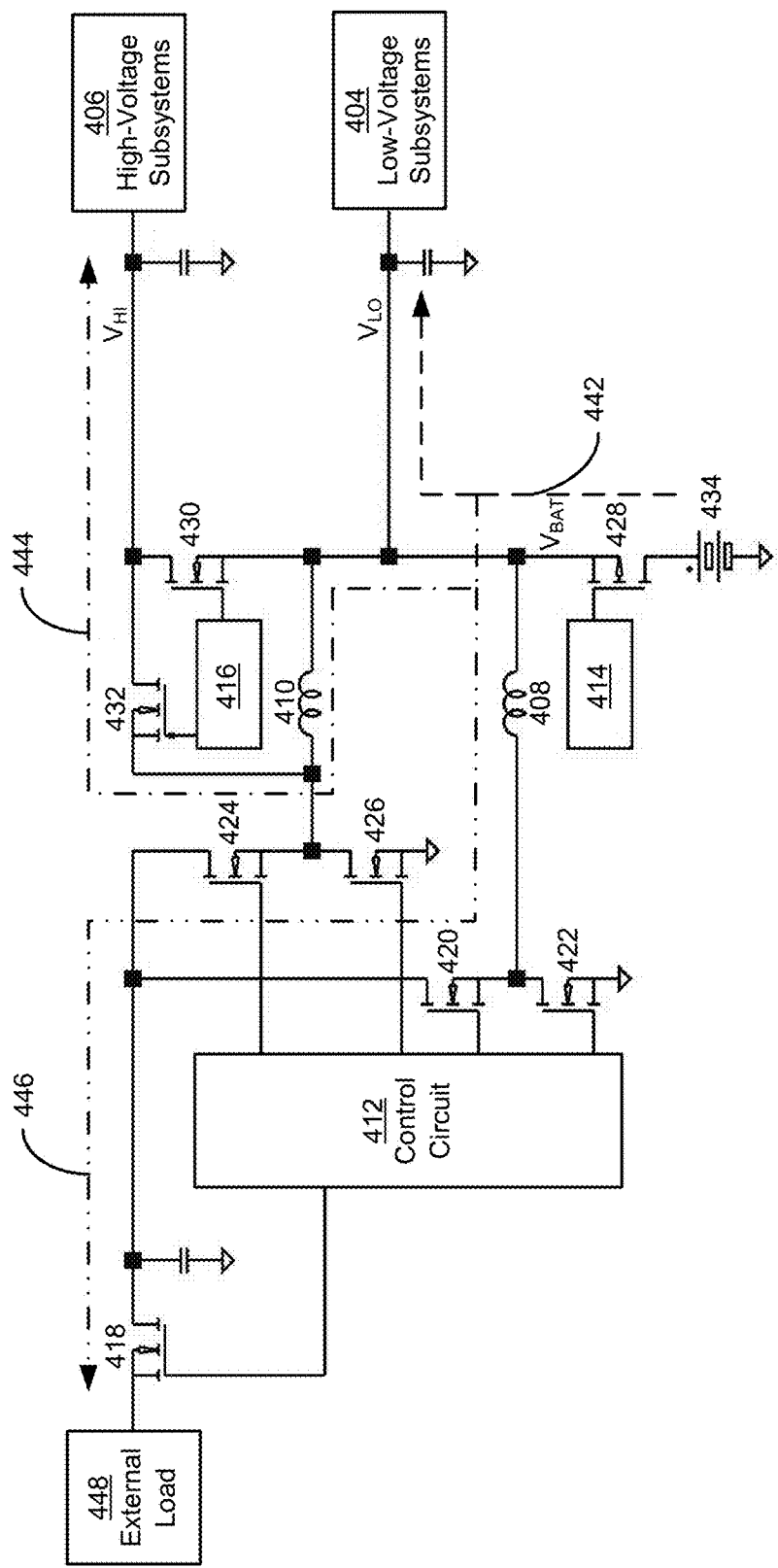
FIG. 4E shows the operation of a charging circuit for a portable electronic device in accordance with the disclosed embodiments.

FIG. 4E shows the operation of a charging circuit for a portable electronic device in accordance with the disclosed embodiments. In particular, FIG. 4E shows the operation of the charging circuit of FIG. 4A during discharging of battery 434 in a low-voltage state with an external load 448 connected to the charging circuit in lieu of power source 402. For example, external load 448 may be a peripheral device that uses the same connector (e.g., a Universal Serial Bus (USB) connector) as power source 402 to receive power from battery 434.

As with the operation of the charging circuit in FIG. 4D, FET 428 is enabled, low-voltage subsystems 404 are powered directly from battery 434 along path 442, and high-voltage subsystems 406 are powered from an up-converted battery voltage using inductor 410, FET 426, and path 444. To provide power to external load 448, control circuit 412 may use inductor 408 and FETs 420-422 to up-convert the battery voltage to at or above the voltage requirement of external load 448. For example, control circuit 412 may use inductor 408 and FETs 420-422 to reverse boost the battery voltage to 5V, which is higher than the 3.4V-3.6V required by high-voltage subsystems 406. To generate an output voltage for powering external load 448, control circuit 412 may switch FETs 420-422 on and off in complementary fashions as part of a servomechanism feedback loop that boosts the battery voltage in the reverse direction to produce 5V at the input terminal of inductor 408. External load 448 may then be powered by current flowing along a path 446 that includes inductor 408 and FETs 418-420.

Figure 4F:
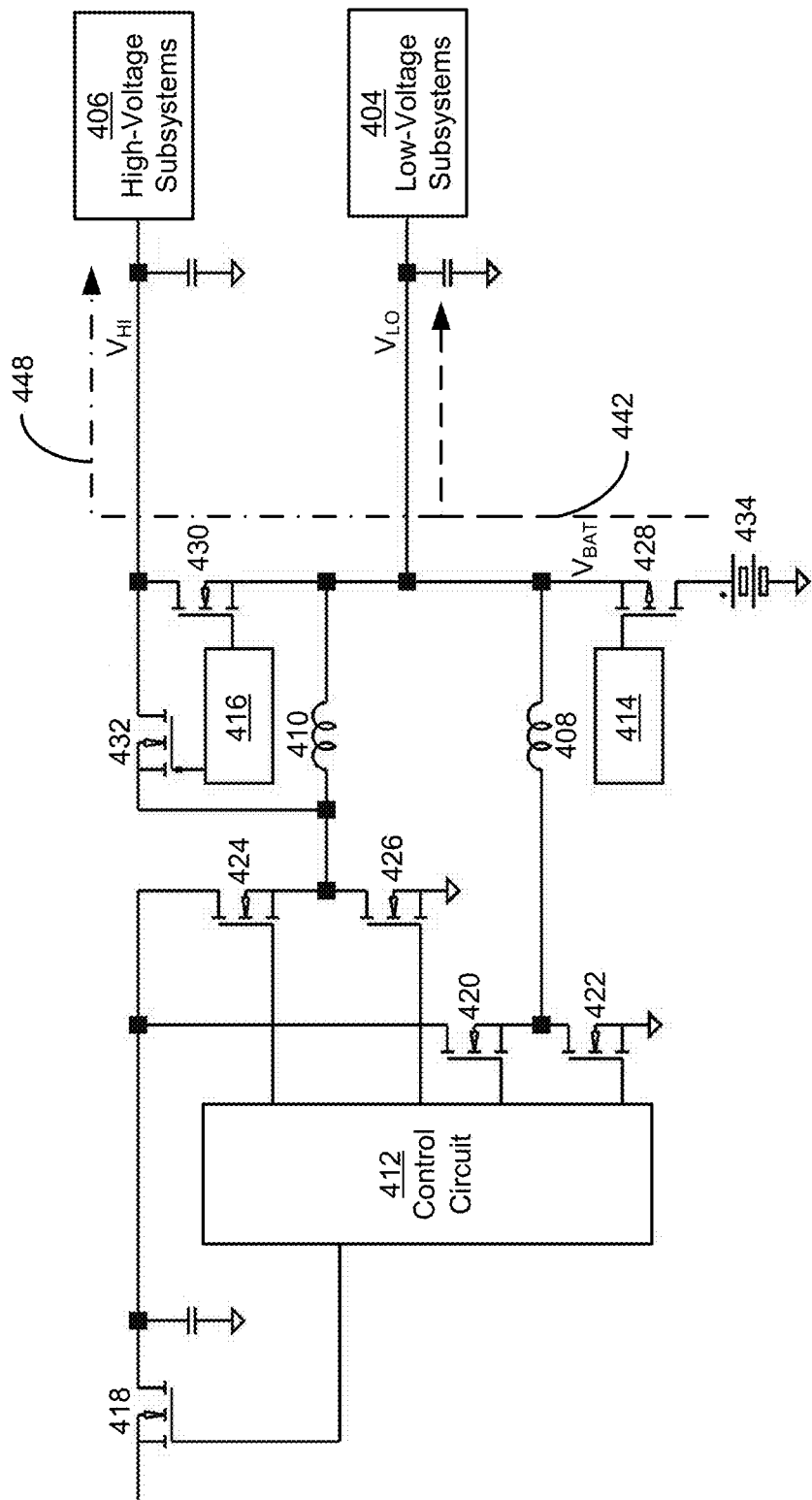
FIG. 4F shows the operation of a charging circuit for a portable electronic device in accordance with the disclosed embodiments.

FIG. 4F shows the operation of a charging circuit for a portable electronic device in accordance with the disclosed embodiments. In particular, FIG. 4F shows the operation of the charging circuit of FIG. 4A during discharging of battery 434 in a high-voltage state. In the high-voltage state, battery 434 may have a voltage that can be used directly by all subsystems (e.g., greater than 3.4V-3.6V).

Like FIGS. 4D-4E, battery 434 has a battery voltage that can be used to directly power low-voltage subsystems 404 along path 442. Moreover, because the battery voltage is higher than the voltage-requirement of high-voltage subsystems 406, the battery voltage may be used to directly power high-voltage subsystems 406 along a bypass path 448 to high-voltage subsystems 406. To allow current from battery 434 to flow along path 448, control circuit 416 may turn FET 430 on and FET 432 off, and control circuit 412 may turn FETs 420-426 off. The battery voltage is thus neither up-converted nor down-converted to power low-voltage subsystems 404 and high-voltage subsystems 406.

During discharging of battery 434 that is between the low-voltage state and high-voltage state (e.g., 3.4V to 3.6V), the charging circuit may alternate between using paths 444 and 448 to power high-voltage subsystems 406. In other words, the charging circuit may power high-voltage subsystems 406 from the up-converted battery voltage from inductor 410, FET 426, and/or path 444, or the charging circuit may power high-voltage subsystems 406 directly from the battery voltage of battery 434 along path 448, which bypasses up-converting of the battery voltage. Such switching between boost and bypass modes may facilitate efficient operation of the charging circuit by allowing the charging circuit to respond to current and/or load transients. For example, a current transient on high-voltage subsystems 406 may cause momentary periods in which powering high-voltage subsystems 406 along path 448 is more efficient than boosting the target voltage through path 444. As a result, the charging circuit may include functionality to detect current transients on high-voltage subsystems 406 and select the most efficient path for powering high-voltage subsystems 406 in response to the current transients.

If an external load (e.g., external load 448 of FIG. 4E) is coupled to the charging circuit, paths 442 and 448 may continue to be used to supply the battery voltage directly to both low-voltage subsystems 404 and high-voltage subsystems 406. Path 446 may then be used by the charging circuit to up-convert the battery voltage into an output voltage that is at or above the voltage requirement of the external load. For example, control circuit 412 may use inductor 408 and FETs 420-422 to reverse boost the battery voltage to 5V, which is higher than the 3.4V-3.6V required by high-voltage subsystems 406. To generate the 5V output voltage for powering external load 448, control circuit 412 may switch FETs 420-422 on and off in complementary fashions as part of a servomechanism feedback loop that boosts the battery voltage in the reverse direction. Current from battery 434 may also flow along path 446 to power the external load.

In the charging circuit of FIGS. 4A-4F, the high-voltage subsystem rail may be regulated twice: once during bucking from the input voltage into a target voltage of battery 434, then a second time during boosting from battery 434 to high-voltage subsystems 406. As a result, the efficiency of the high-voltage subsystem rail may be reduced by the boost stage efficiency multiplied by the buck stage efficiency.

Figure 4G:
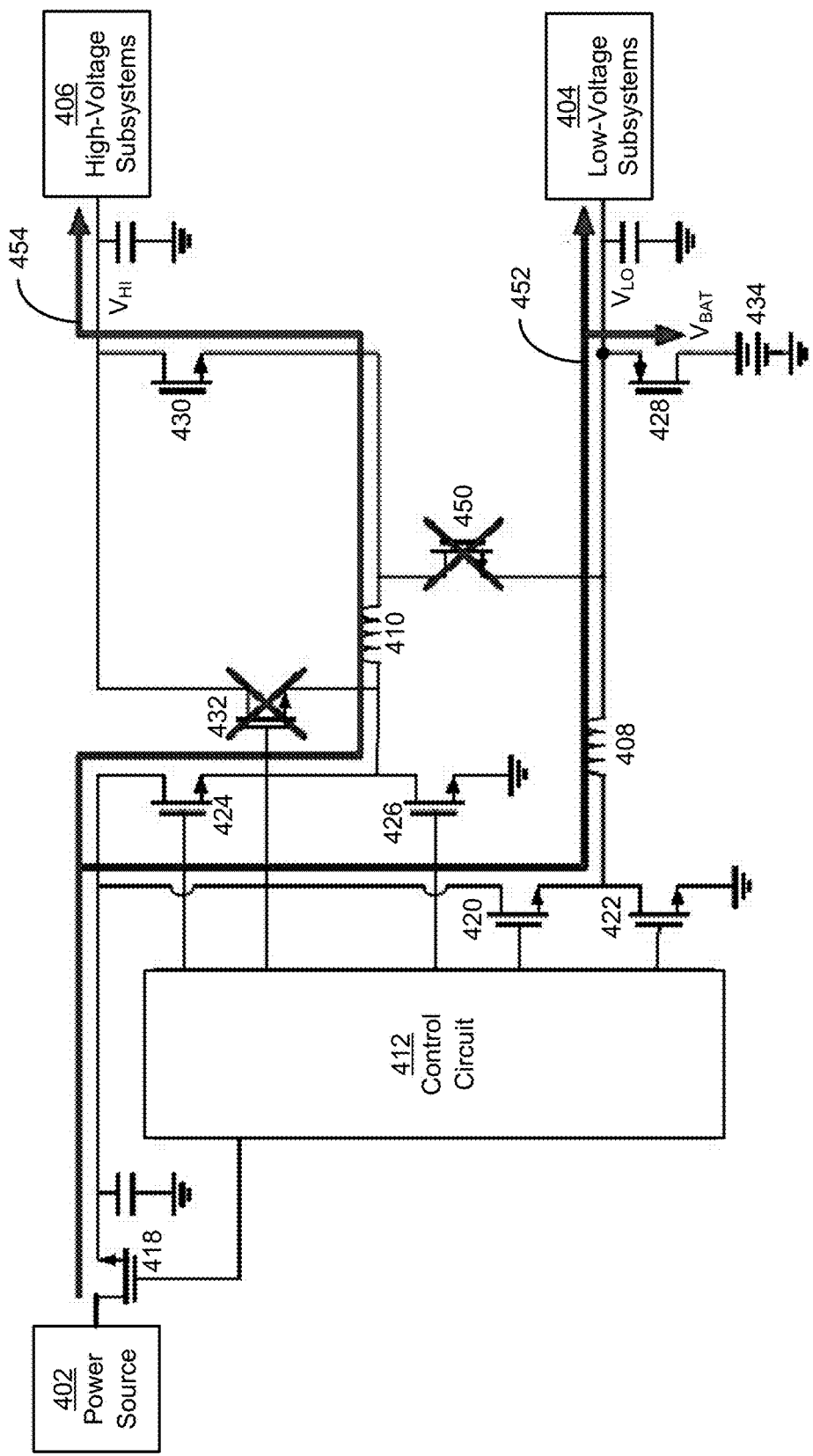
FIG. 4G shows the operation of a charging circuit for a portable electronic device in accordance with the disclosed embodiments.

To improve the efficiency of the high-voltage subsystem rail, the high-voltage subsystem rail may be regulated directly from the input voltage instead of from the low-voltage subsystem rail. To accomplish this type of regulation, a single power FET may be added to the charging circuit of FIGS. 4A-4F. In particular, FIG. 4G shows the operation of the charging circuit of FIG. 4A during low-current charging of battery 434 and the added FET 450. During operation of the charging circuit, FETs 432 and 450 are switched off, and FETs 428-430 are enabled in bypass mode to allow charging of battery 434 and powering of high-voltage subsystems 406 from down-conversion of the input voltage along a low-voltage subsystem rail 452 and a high-voltage subsystem rail 454, respectively.

FET 450 may allow both phases of the switching converter to operate independently as two separate bucks. Inductor 410 may be used in the first phase to generate the voltage for high-voltage subsystems 406 along high-voltage subsystem rail 454, and inductor 408 may be used in the second phase to supply power to low-voltage subsystems 404 along low-voltage subsystem rail 452. As described above, the same mechanism may be accomplished by operating one or more FETs (e.g., FET 430) in a linear-regulation mode, which is very inefficient and renders high-voltage inputs unusable due to power dissipation with large downstream loads. The operation of the charging circuit of FIG. 4G provides a significantly more efficient step-down regulation architecture, with the difference in power losses between the two methods expressed as $I^2R$ for linear regulation and less than 15% of the input power for step-down regulation.

Inductor 410 may be used to supply power to high-voltage subsystem rail 454 from the input voltage whenever battery charge currents are low enough that two phases are not required. Such low battery charge currents may be found during, for example, the coupling of an underpowered power source 420 to the charging circuit. Because the underpowered power source 420 cannot supply a full charge current to battery 434, control circuit 412 may use inductor 410 to supply high-voltage subsystem rail 454 by down-converting the input voltage from power source 402. In a second example, low battery charge currents may occur during the end of a charge cycle, when the charging circuit only needs to supply current to low-voltage subsystems 404 and high-voltage subsystems 406. In a third example, low battery charge currents may coincide with constant-voltage charging of battery 434. Once the charge current falls to approximately 50% of the full charge current, control circuit 412 may down-convert the input voltage to supply high-voltage subsystem rail 454. Selection of the operating mode of the charging circuit may be done via hardware and/or software and can depend on the state-of-charge of battery 434, system thermal measurements, and/or other system-level information.

Figure 4H:
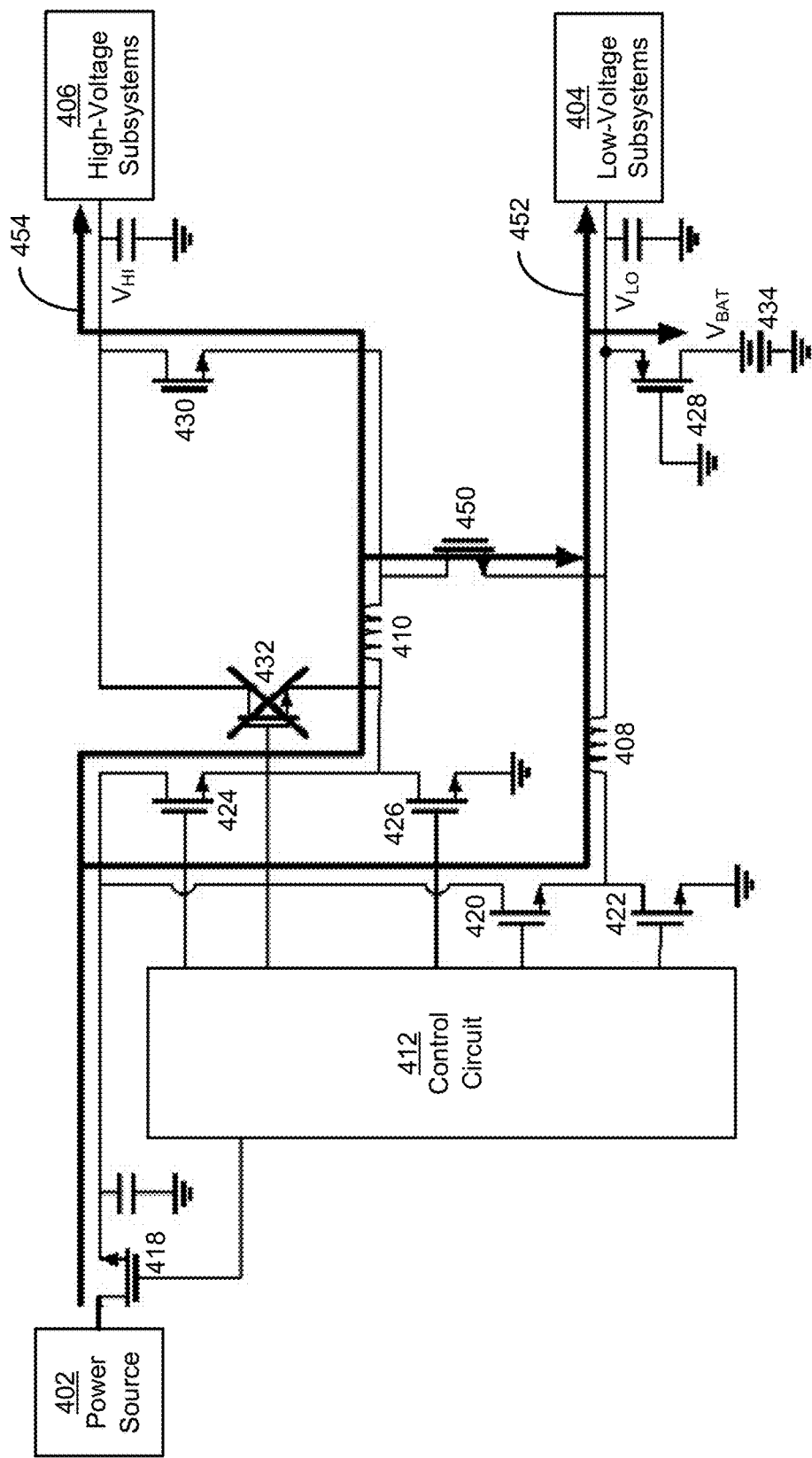
FIG. 4H shows the operation of a charging circuit for a portable electronic device in accordance with the disclosed embodiments.
Figure 4I:
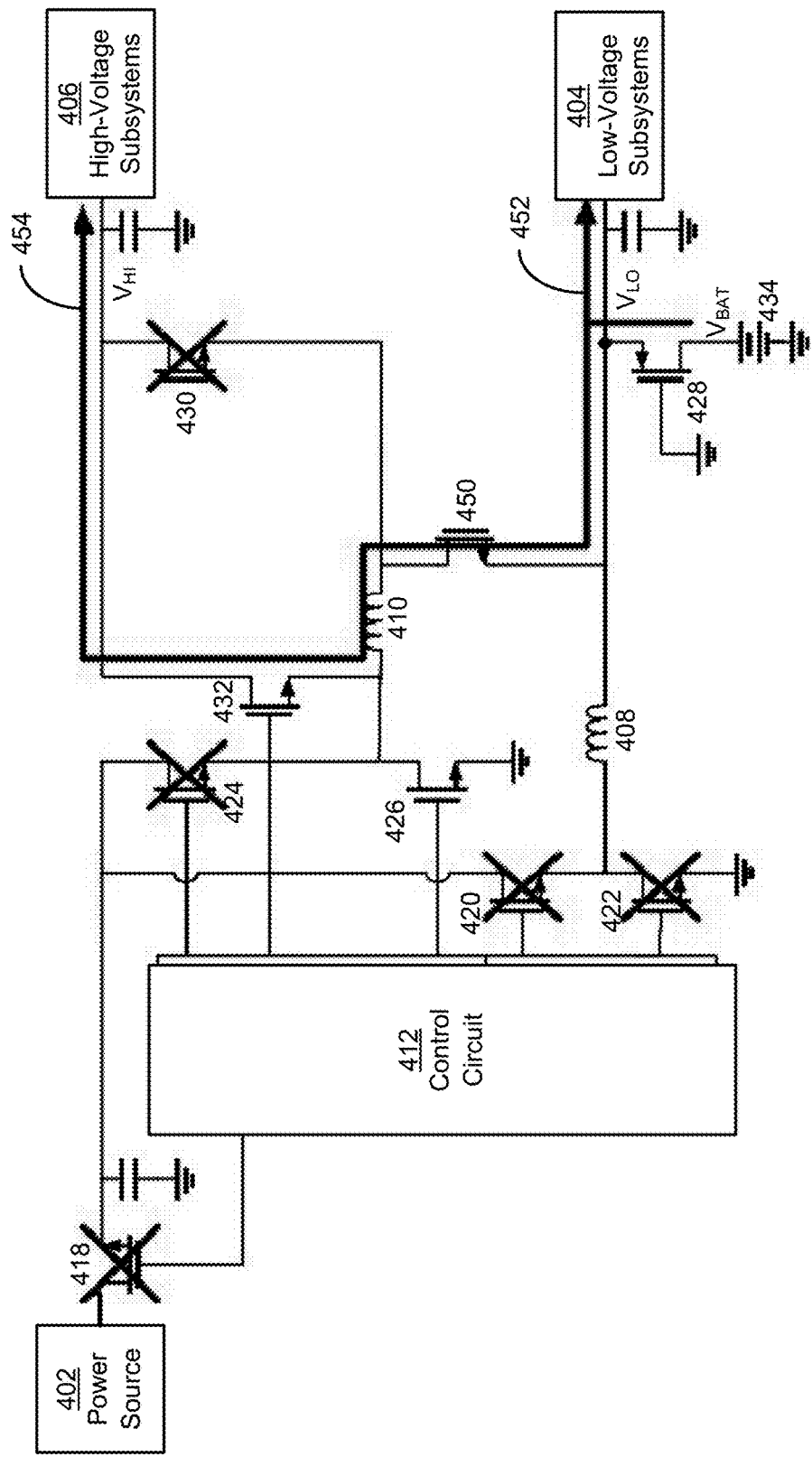
FIG. 4I shows the operation of a charging circuit for a portable electronic device in accordance with the disclosed embodiments.
Figure 4J:
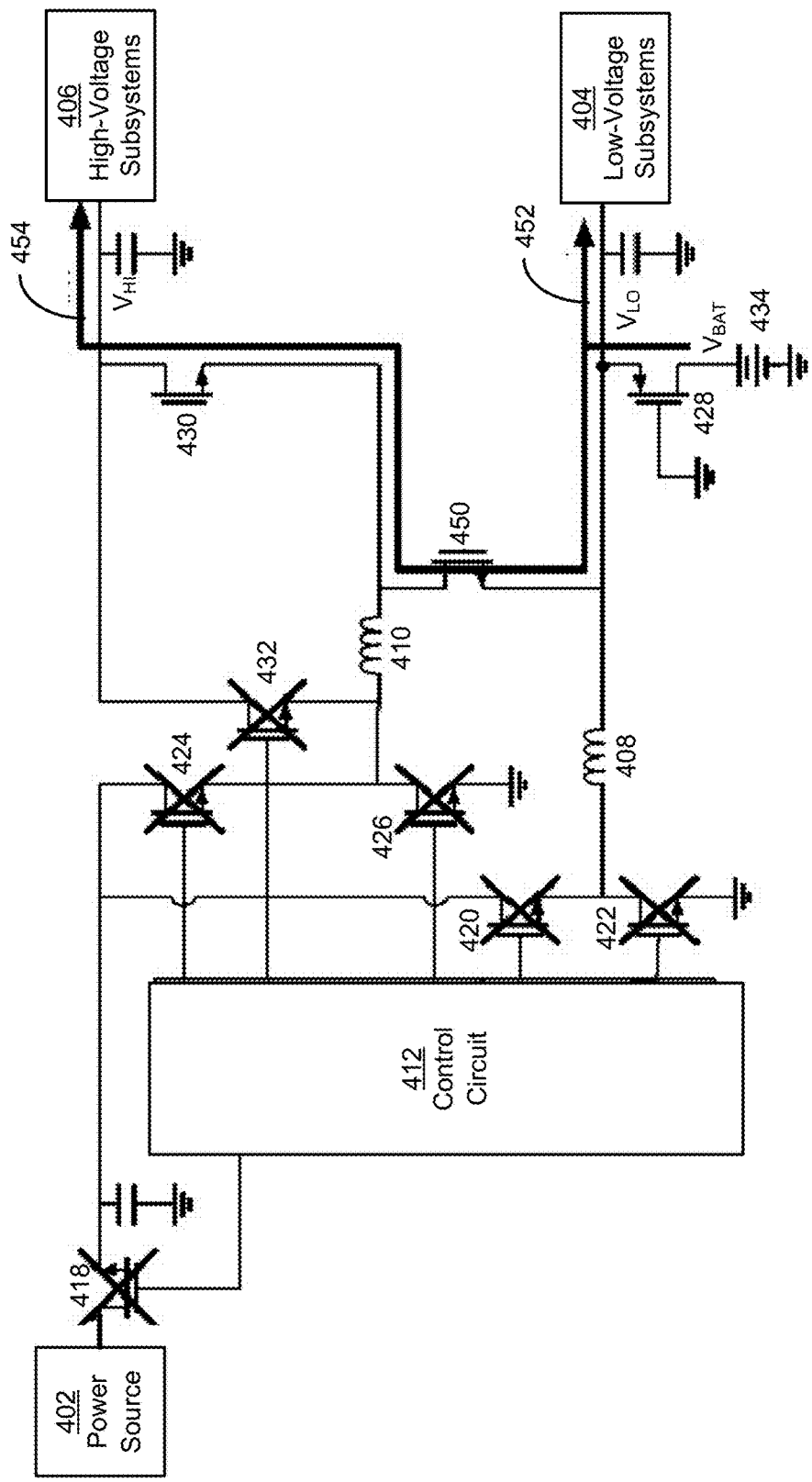
FIG. 4J shows the operation of a charging circuit for a portable electronic device in accordance with the disclosed embodiments.

FIGS. 4H-4J shows the operation of a charging circuit for a portable electronic device in accordance with the disclosed embodiments. In particular, 4H shows the operation of the charging circuit of FIG. 4G during high-current charging of battery 434. Control circuit 412 may operate in a first phase that uses inductor 410 and FETs 424-426 to down-convert the input voltage to supply high-voltage subsystem rail 454. Control circuit 412 may also operate in a second phase that uses inductor 408 and FETs 420-422 to down-convert the input voltage to supply low-voltage subsystem rail 452 and charge battery 434 at the target voltage of battery 434.

In the charging circuit of FIG. 4H, FET 432 may be switched off, and FET 430 may be operated as a linear regulator to supply high-voltage subsystem rail 454 from the input voltage. Alternatively, FET 430 may be used as a bypass switch to improve power losses if the voltage requirements of high-voltage subsystem rail 454 are compatible with the input voltage from power source 402.

FIG. 4I shows the operation of the charging circuit of FIG. 4G during discharge of a low-voltage battery 434, and FIG. 4J shows the operation of the charging circuit of FIG. 4G during discharge of a high-voltage battery 434. Using the charging circuit to discharge battery 434 in FIGS. 4I-4J is similar to the operation of the charging circuit during discharge of battery 434 in FIGS. 4D-4F. In FIG. 4I, inductor 410 is used to boost the battery voltage from battery 434 to supply high-voltage subsystem rail 454. During discharge of a high-voltage battery 434 in FIG. 4J, the voltage of high-voltage subsystem rail 454 may be linearly regulated from FET 430, which may increase power losses.

To further reduce power losses over the charging circuit of FIGS. 4G-4J, inductor 410 may be converted into a four-switch buck-boost. FIGS. 4K-4O shows the operation of a charging circuit for a portable electronic device in accordance with the disclosed embodiments. The charging circuit of FIGS. 4K-4O includes one more FET 456 than the charging circuit of FIGS. 4G-4J. FET 456 may allow inductor 410 to be converted into a four-switch buck-boost, which enables efficient powering of high-voltage subsystem rail 454 for all charging, discharging, high-battery-voltage, and low-battery-voltage cases.

Figure 4K:
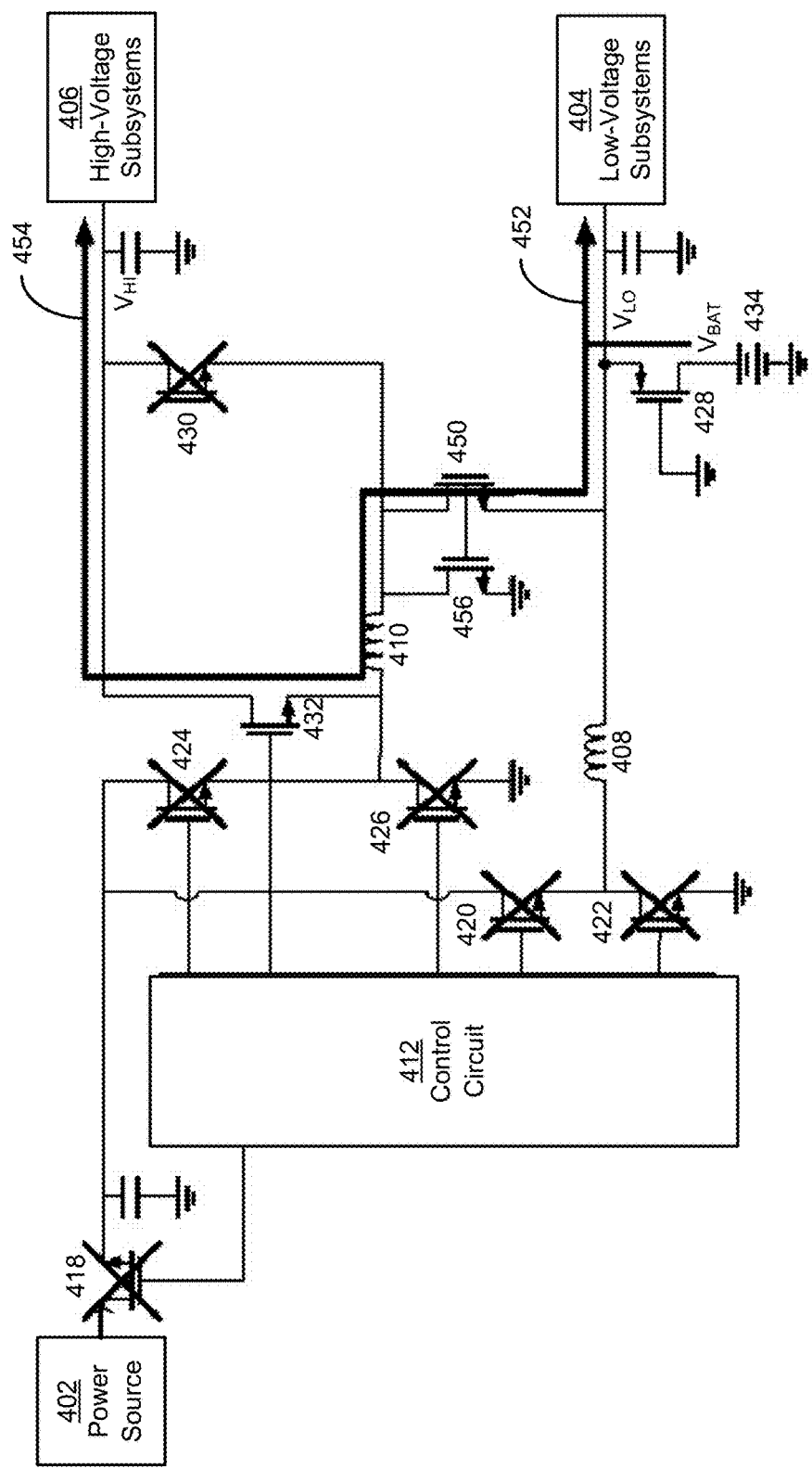
FIG. 4K shows the operation of a charging circuit for a portable electronic device in accordance with the disclosed embodiments.

More specifically, FIG. 4K shows the operation of the charging circuit during discharge of a high-voltage battery 434. In FIG. 4K, FETs 418-426 and 430 are off, FET 432 is operated in bypass mode, and FETs 450 and 456 are operated in buck mode to down-convert the battery voltage from battery 434 before supplying high-voltage subsystem rail 454.

Figure 4L:
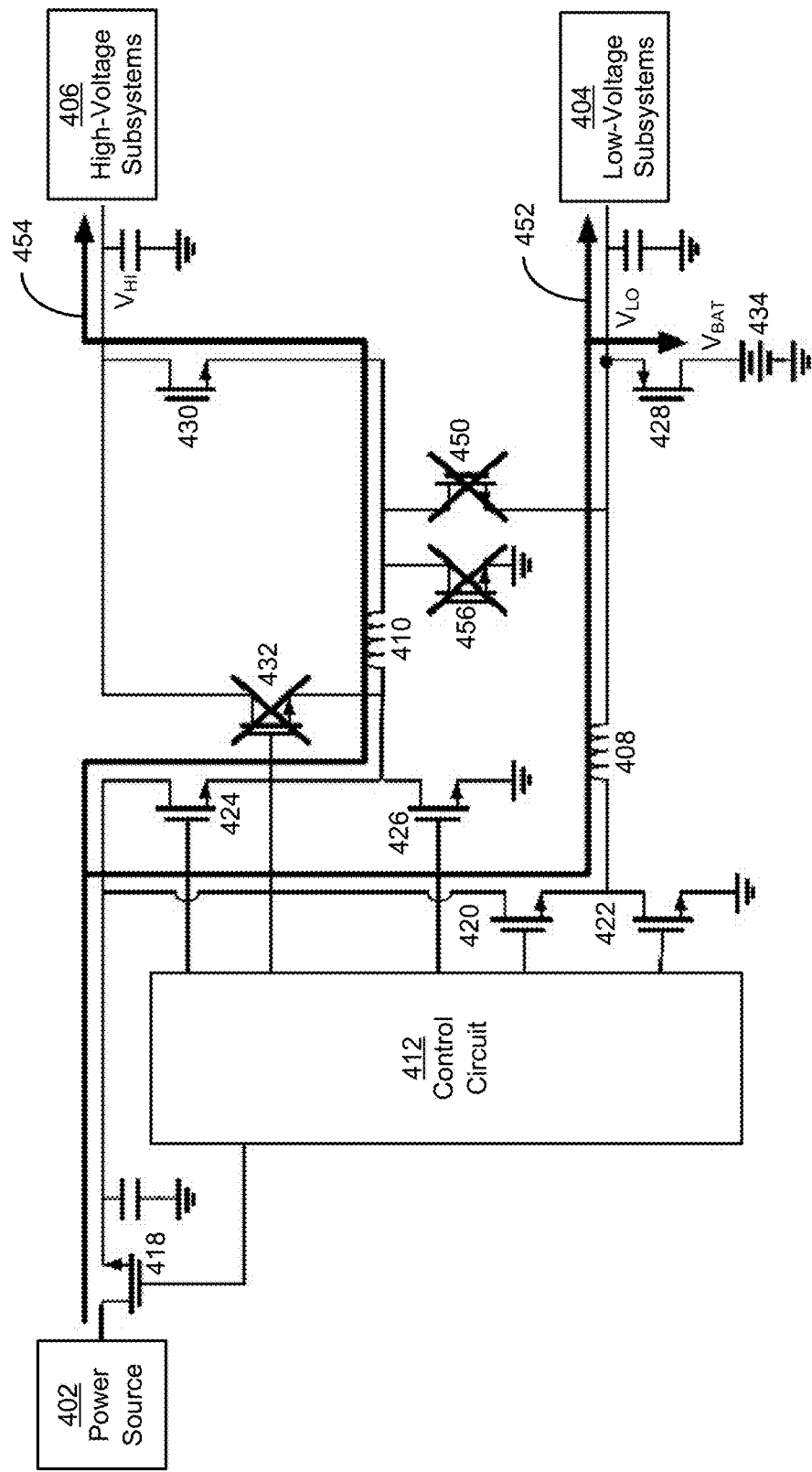
FIG. 4L shows the operation of a charging circuit for a portable electronic device in accordance with the disclosed embodiments.

FIG. 4L shows the operation of the charging circuit during low-current charging of a low-voltage battery 434. In FIG. 4L, FETs 432, 450 and 456 are off, FETs 424-426 and inductor 410 are used to down-convert the input voltage to supply high-voltage subsystem rail 454, and FETs 428-430 and inductor 408 are used to down-convert the input voltage to supply low-voltage subsystem rail 452 and charge battery 434 at the target voltage of battery 434. FETs 428-430 are operated in bypass mode to enable charging of battery 434 and powering of high-voltage subsystems 406 from down-conversion of the input voltage along high-voltage subsystem rail 454.

Figure 4M:
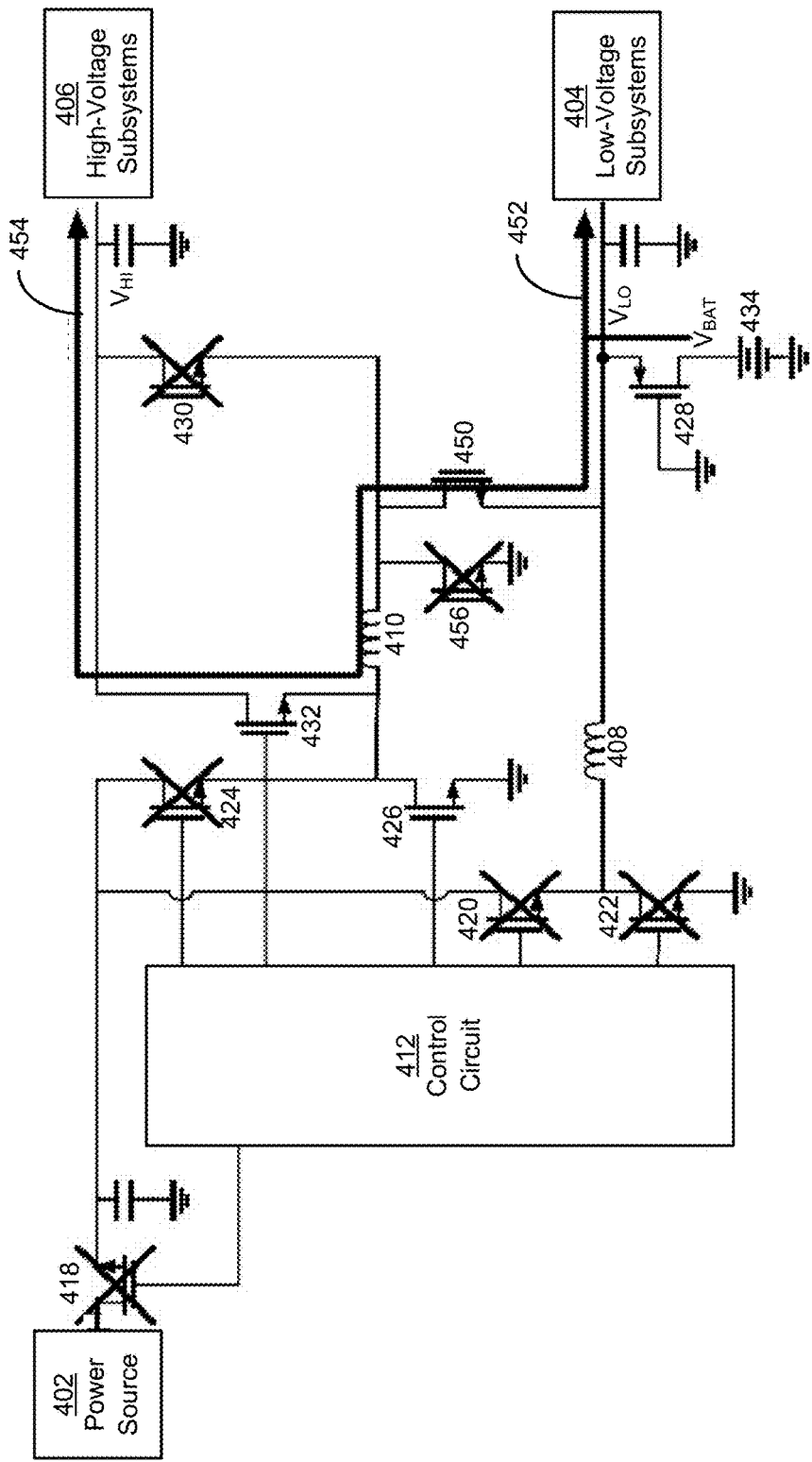
FIG. 4M shows the operation of a charging circuit for a portable electronic device in accordance with the disclosed embodiments.

FIG. 4M shows the operation of the charging circuit during discharge of a low-voltage battery 434. In FIG. 4M, FETs 418-424, 430, and 456 are off. Low-voltage subsystem rail 452 is supplied directly from the battery voltage of battery 434. FET 450 is operated in bypass mode to allow inductor 410 and FETs 426 and 432 to up-convert the battery voltage from battery 434 into a voltage requirement of high-voltage subsystems 406.

Figure 4N:
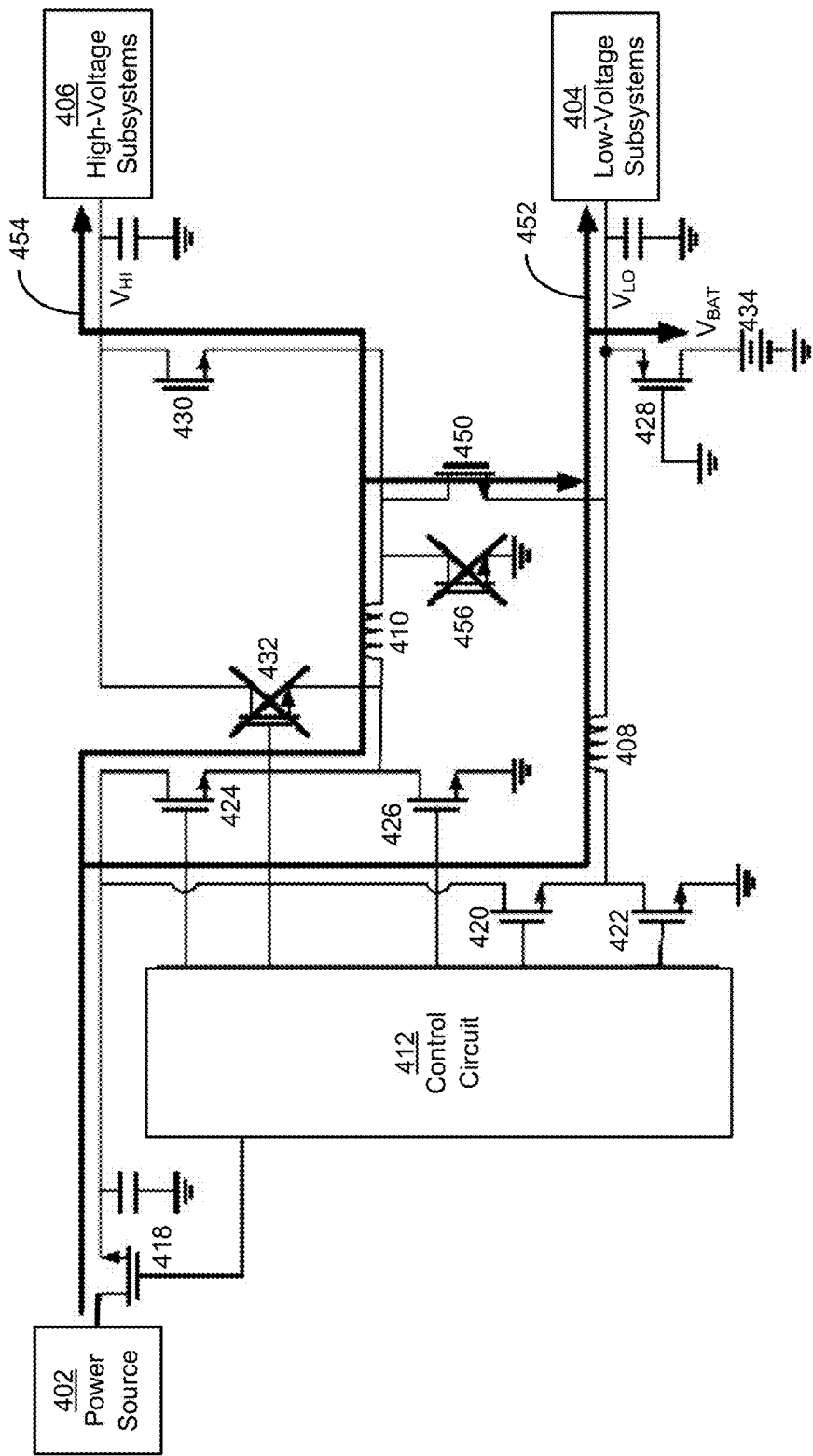
FIG. 4N shows the operation of a charging circuit for a portable electronic device in accordance with the disclosed embodiments.

FIG. 4N shows the operation of the charging circuit during high-current charging of a high-voltage battery 434. In FIG. 4N, high-voltage subsystem rail 454 may be supplied linearly by FET 430 when charging at high currents. FETs 432 and 456 are switched off, and FET 450 is operated in bypass mode to allow the input voltage to be down-converted into a target voltage of battery 434 that is used to charge battery 434 and supply low-voltage subsystem rail 452.

Figure 4O:
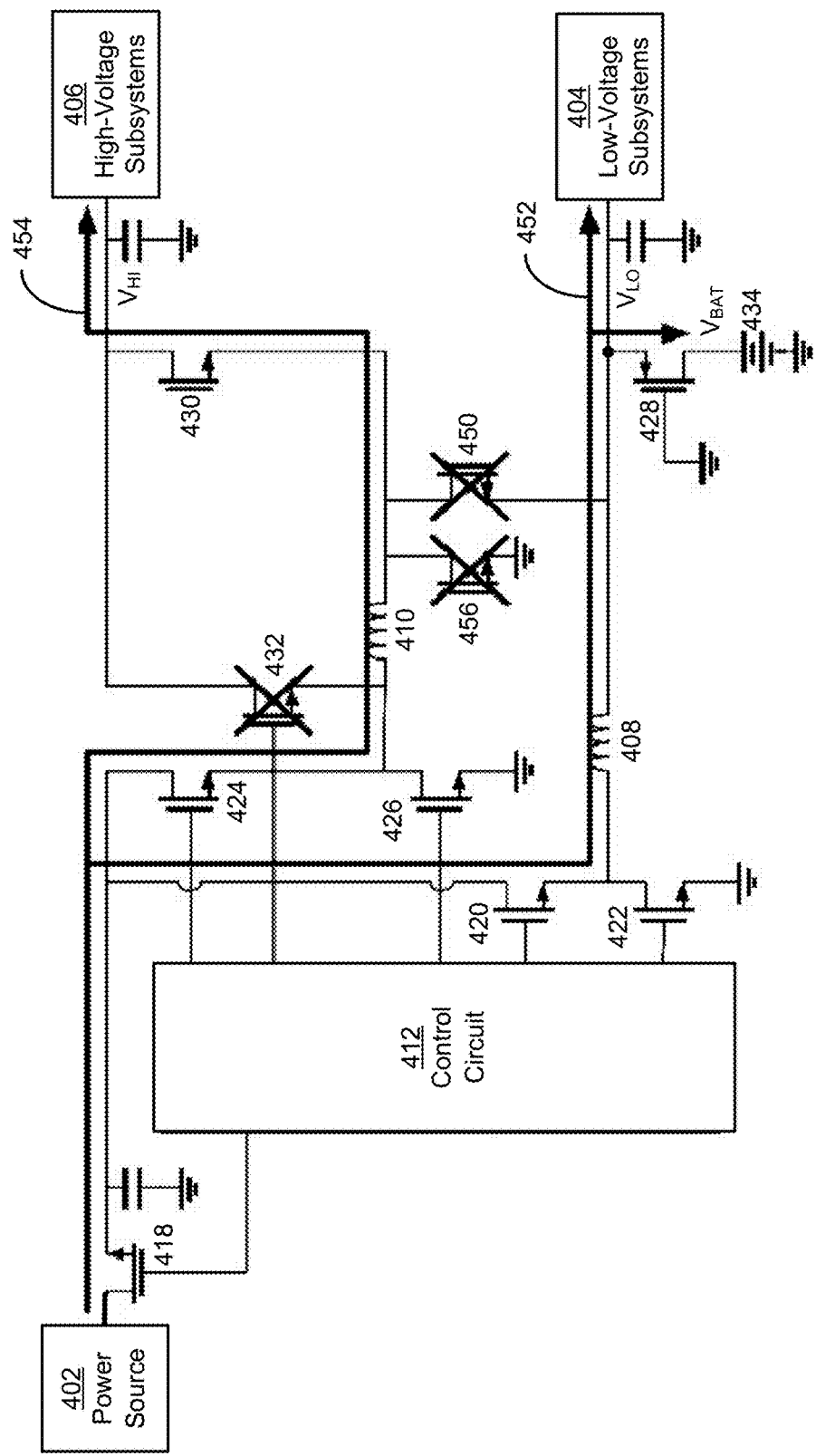
FIG. 4O shows the operation of a charging circuit for a portable electronic device in accordance with the disclosed embodiments.

FIG. 4O shows the operation of the charging circuit during low-current charging of a high-voltage battery 434. In FIG. 4O, FETs 432, 450 and 456 are off. FETs 428-430 are operated in bypass mode to allow charging of battery 434 and powering of high-voltage subsystems 406. The input voltage is down-converted into the target voltage of battery 434 by inductor 408 and FETs 420-422, and the target voltage is used to charge battery 434 and supply low-voltage subsystem rail 452. The input voltage is also down-converted to supply high-voltage subsystem rail 454.

Figure 5:
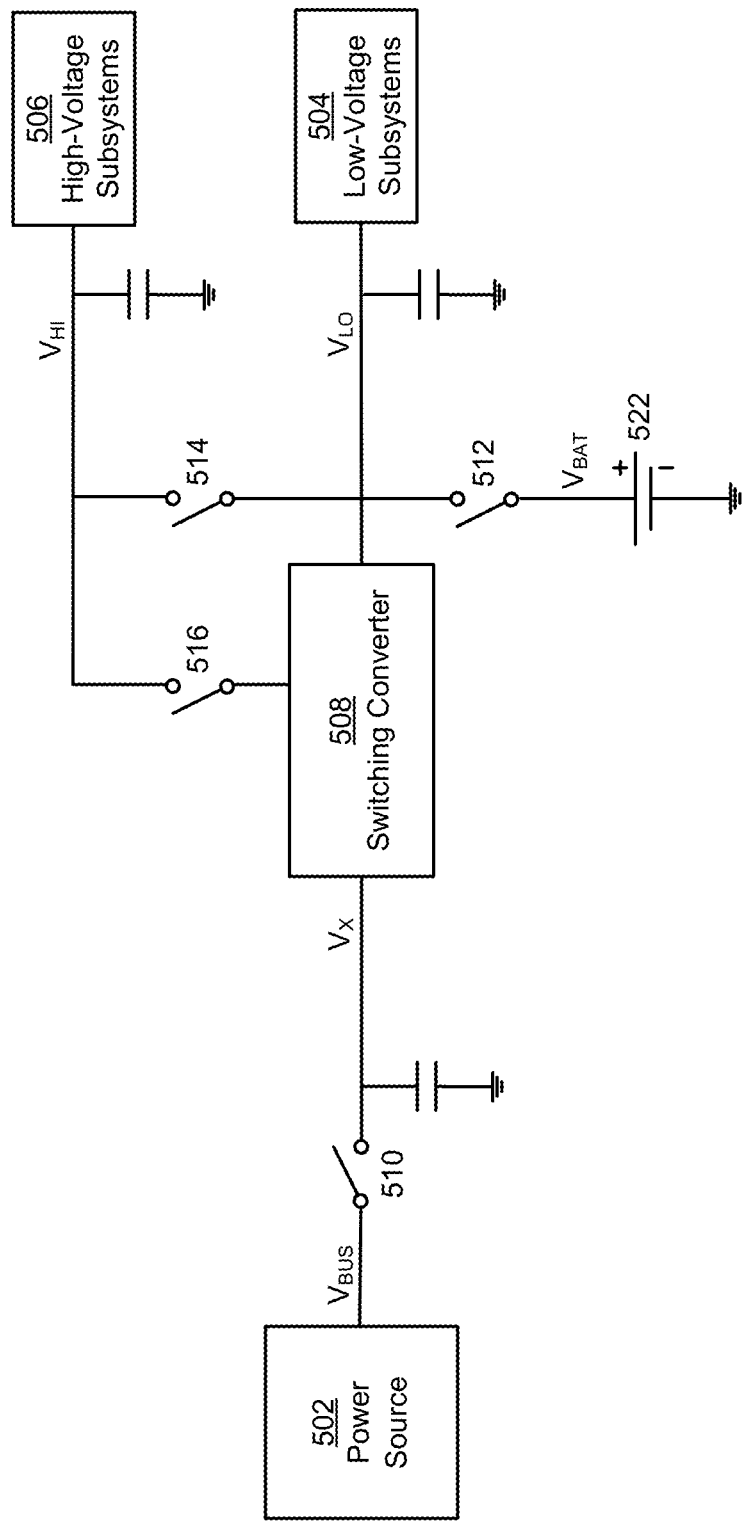
FIG. 5 shows a charging system for a portable electronic device in accordance with the disclosed embodiments.

FIG. 5 shows a charging system for a portable electronic device in accordance with the disclosed embodiments. The charging system of FIG. 5 may convert an input voltage from a power source 502 and/or a battery voltage from a battery 522 into a set of output voltages for charging battery 522 and/or powering one or more low-voltage subsystems 504 and one or more high-voltage subsystems 506.

As shown in FIG. 5, the charging system includes a switching converter 508. Switching converter 508 may include one or more inductors and a set of switching mechanisms such as FETs, diodes, and/or other electronic switching components. For example, switching converter 508 may be provided by the multi-phase switching converter shown in FIG. 4A, which includes two inductors (e.g., inductors 408-410), each with an input terminal and a load terminal. Inductor 408 may be associated with two switching mechanisms (e.g., as provided by FETs 420-422), which are configured to couple the input terminal of inductor 408 to the input voltage or a reference voltage (e.g., ground). Inductor 410 may also be associated with a number of switching mechanisms (e.g., as provided by FETs 424-426 and 430-432), which are configured to couple the input terminal of inductor 410 to the input voltage, the reference voltage, and high-voltage subsystems 406 and the load terminal of inductor 410 to high-voltage subsystems 406, respectively.

The charging system may also include switching mechanisms 510-516, which collectively may be used to couple power source 502, battery 522, high-voltage subsystems 506, and/or low-voltage subsystems 504 to one another and/or switching converter 508. Each switching mechanism may selectively couple different voltage nodes and may include a switch, a FET (e.g., FETs 418-432 of FIG. 4A), a diode, and/or another switching mechanism. For example, switching mechanism 510 may provide reverse voltage protection from an improperly functioning power source 502 (e.g., a power source with a faulty design or an incorrectly connected power source 502) and may prevent current flowing from the voltage node $V_X$ to power source 502 (shown there as $V_{BUS}$). Switching mechanism 516 may couple high-voltage subsystems 506 to a boost path, which is used by switching converter 508 to up-convert the battery voltage and/or target voltage of battery 522 $V_{BAT}$ to power high-voltage subsystems 506. Switching mechanism 514 may couple high-voltage subsystems 506 to a bypass path, which is used by the charging system to power high-voltage subsystems 506 directly from the battery voltage and/or target voltage. Switching mechanism 512 may selectively couple voltage node $V_{LO}$ to battery 522 to enable or disable charging or discharging of battery 522.

Inductors in switching converter 508 may additionally be grouped into two or more inductor groups. In other words, switching converter 508 may include a first inductor group that is used to down-convert the input voltage into the target voltage of battery 522 and/or up-convert the battery voltage of battery 522 to power an external load that can take the place of power source 502. Switching converter 508 may also include a second inductor group that is used to up-convert the target voltage and/or battery voltage to power high-voltage subsystems 506.

If an inductor group includes two or more inductors, the membership of an inductor in the inductor group may be switched to another inductor group to facilitate operation of the charging system. For example, one of two inductors in the first inductor group may be switched to the second inductor group with one inductor to enhance the operation of the second inductor group. In addition, the switch may be triggered if the difference between the voltage requirement of high-voltage subsystems 506 and the battery or target voltage of battery 522 changes beyond a threshold. For example, an inductor may be switched from the first inductor group to the second inductor group during discharge of battery 522 after the battery voltage falls to more than 0.4V below the voltage requirement of high-voltage subsystems 506 to facilitate up-converting of the battery voltage to the voltage requirement. Conversely, an inductor may be switched from the second inductor group to the first inductor group during charging of battery 522 after the battery voltage increases to near or above the voltage requirement of high-voltage subsystems 506 to facilitate efficient charging of battery 522.

Figure 6:
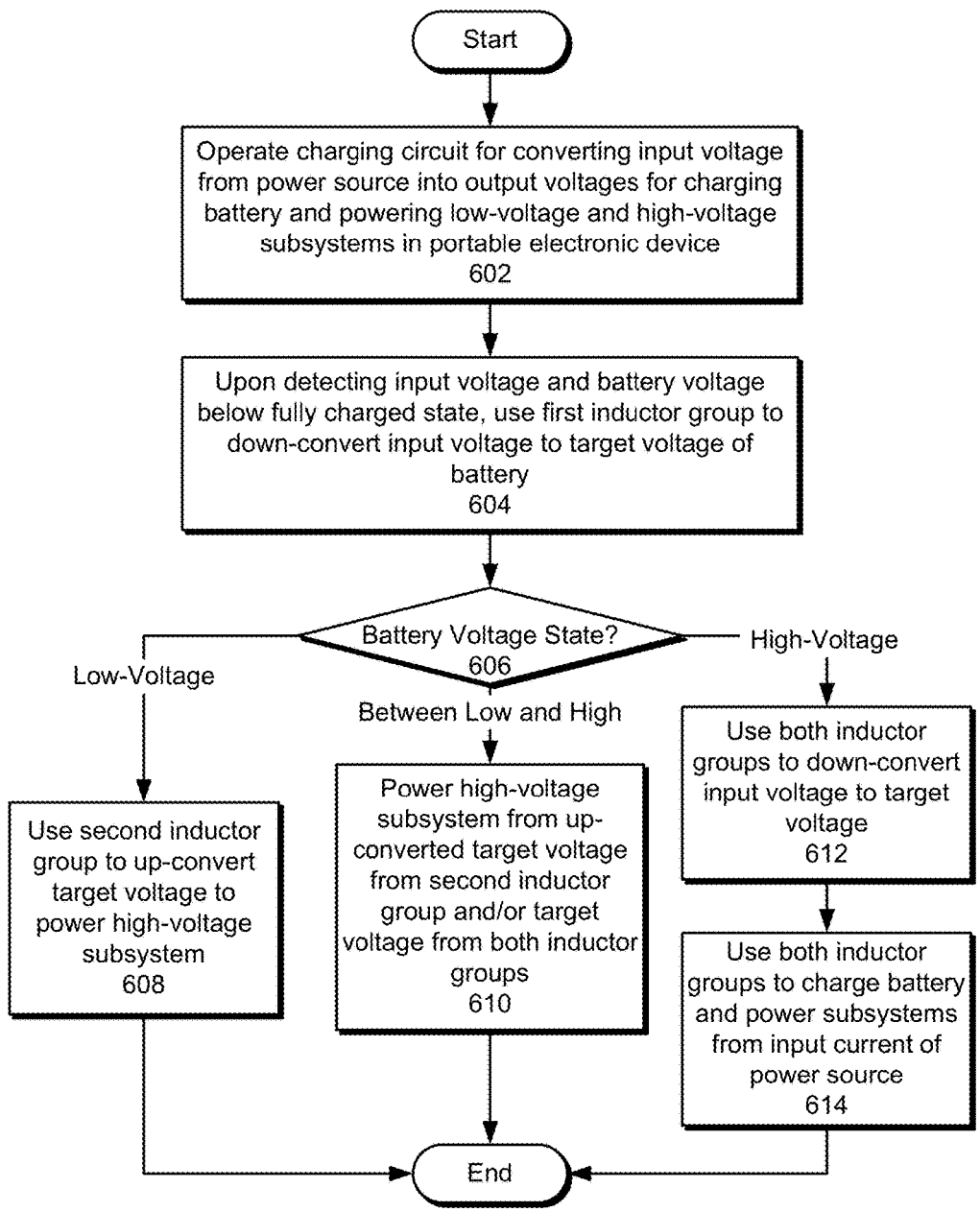
FIG. 6 shows a flowchart illustrating the process of managing use of a battery in a portable electronic device in accordance with the disclosed embodiments.

FIG. 6 shows a flowchart illustrating the process of managing use of a battery in a portable electronic device in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the embodiments.

Initially, a charging circuit for converting an input voltage from a power source into a set of output voltages for charging a battery and powering a low-voltage subsystem and a high-voltage subsystem in a portable electronic device is operated (operation 602). The charging circuit may include a first inductor group and a second inductor group. Each inductor group may include one or more inductors that can be configured to boost or buck the input voltage and/or a target voltage of the battery. During operation of the charging circuit, the first inductor group is used to down-convert the input voltage to a target voltage of the battery upon detecting the input voltage and a battery voltage that is below a fully charged state (operation 604) of the battery. In other words, the first inductor group may be used to charge the battery at a target voltage of the battery, which is lower than the input voltage.

Additional operation of the charging circuit may be based on a voltage state of the battery (operation 606). If the battery is in a low-voltage state, the second inductor group is used to up-convert the target voltage to power the high-voltage subsystem (operation 608). For example, the target voltage may be up-converted (e.g., boosted) because the low-voltage state of the battery precludes direct powering of the high-power subsystem from the target voltage used to charge the battery.

If the battery is in a high-voltage state, both inductor groups are used to down-convert the input voltage to the target voltage (operation 612) and charge the battery and power both subsystems from the input current of the power source (operation 614). In the high-voltage state, the target voltage is at or above the voltage requirement of the high-voltage subsystems. As a result, the use of both inductor groups to supply input current from the power source and down-convert the input voltage to the target voltage may facilitate efficient charging of the battery and allow both subsystems to be powered from the same target voltage.

If the battery is between the low-voltage state and the high-voltage state, the high-voltage subsystem is powered from the up-converted target voltage from the second inductor group and/or the target voltage from both inductor groups (operation 610). In other words, the high-voltage subsystem may be powered by the same operation of the charging circuit as either the low-voltage state (e.g., up-converted target voltage) or the high-voltage state (e.g., target voltage), depending on current transients and/or other factors associated with the high-voltage subsystem and/or charging circuit.

Figure 7:
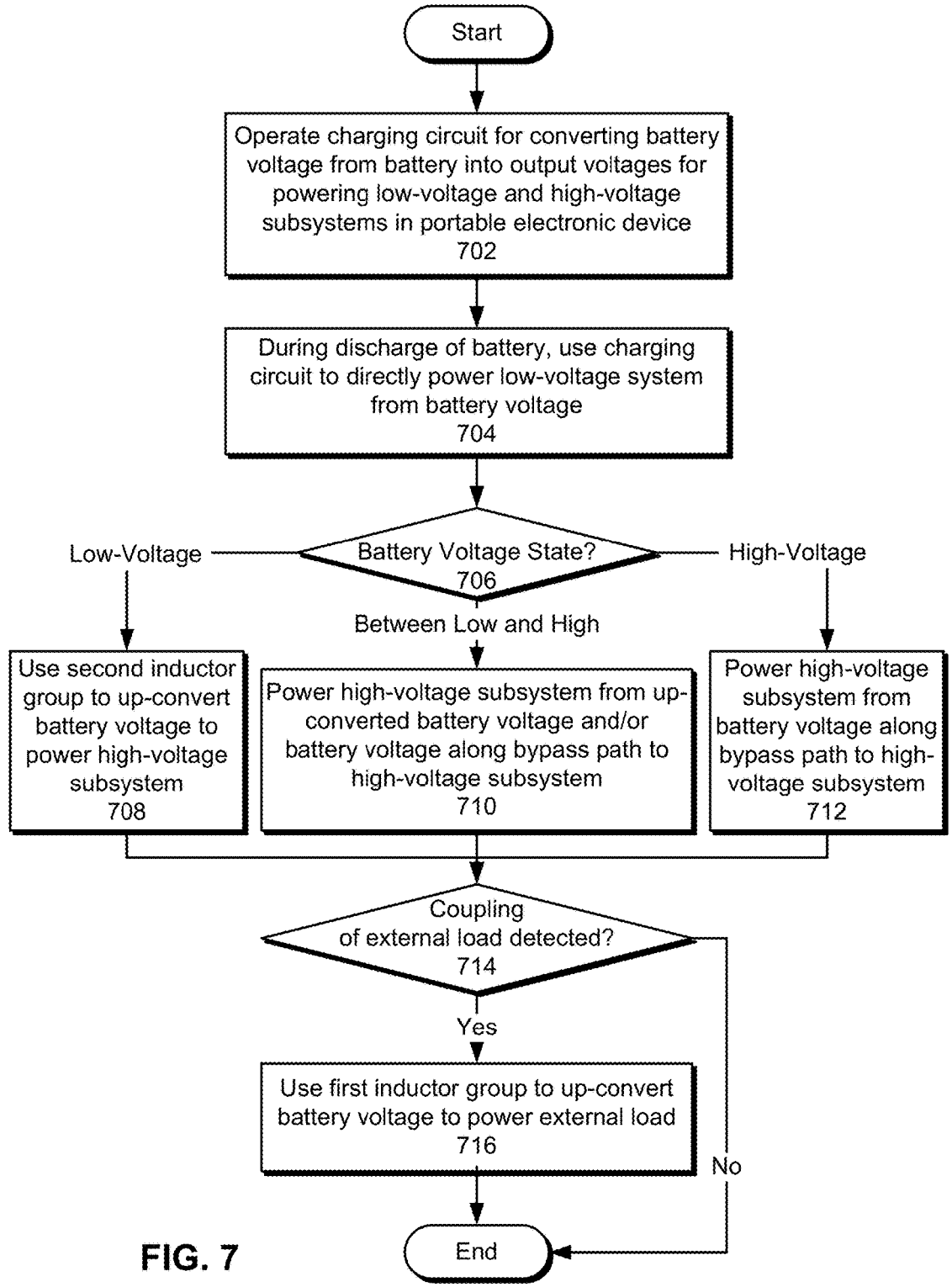
FIG. 7 shows a flowchart illustrating the process of managing use of a battery in a portable electronic device in accordance with the disclosed embodiments.

FIG. 7 shows a flowchart illustrating the process of managing use of a battery in a portable electronic device in accordance with the disclosed embodiments. In one or more embodiments, one or more of the steps may be omitted, repeated, and/or performed in a different order. Accordingly, the specific arrangement of steps shown in FIG. 7 should not be construed as limiting the scope of the embodiments.

Initially, a charging circuit for converting a battery voltage from the battery into a set of output voltages for powering a low-voltage subsystem and a high-voltage subsystem in a portable electronic device is operated (operation 702). The charging circuit may include a first inductor group and a second inductor group. During operation of the charging circuit, the charging circuit is used to directly power the low-voltage subsystem from the battery voltage during discharge of the battery (operation 704). The low-voltage subsystem may thus have a voltage requirement that is at or below the cutoff voltage of the battery. In addition, discharging of the battery may be discontinued once the battery reaches the cutoff voltage.

Additional operation of the charging circuit may be based on a voltage state of the battery (operation 706). If the battery is in a low-voltage state, the second inductor group is used to up-convert the battery voltage to power the high-voltage subsystem (operation 708). For example, the battery voltage may be up-converted (e.g., boosted) because the low-voltage state of the battery precludes direct powering of the high-power subsystem from the battery voltage of the discharging battery.

If the battery is in a high-voltage state, the high-voltage subsystem is powered from the battery voltage along a bypass path to the high-voltage subsystem (operation 712). In the high-voltage state, the target voltage is at or above the voltage requirement of the high-voltage subsystem. As a result, the bypass path may bypass the second inductor group and allow the high-voltage subsystem to be powered directly from the battery voltage.

If the battery is in between the low-voltage state and the high-voltage state, the high-voltage subsystem is powered from the up-converted battery voltage and/or the battery voltage along the bypass path (operation 710). The high-voltage subsystem may thus be powered by the same operation of the charging circuit as either the low-voltage state (e.g., up-converted battery voltage) or the high-voltage state (e.g., target voltage and bypass path), depending on current transients and/or other factors associated with the high-voltage subsystem and/or charging circuit.

The coupling of an external load to the portable electronic device may also be detected (operation 714). If no external load is detected, the charging circuit may continue to be operated based on the voltage state of the battery. If an external load is detected, the first inductor group is used to up-convert the battery voltage to power the external load (operation 716). For example, the first inductor group is used to generate an output voltage that is higher than the battery voltage and meets the voltage requirement of the external load.

Figure 8:
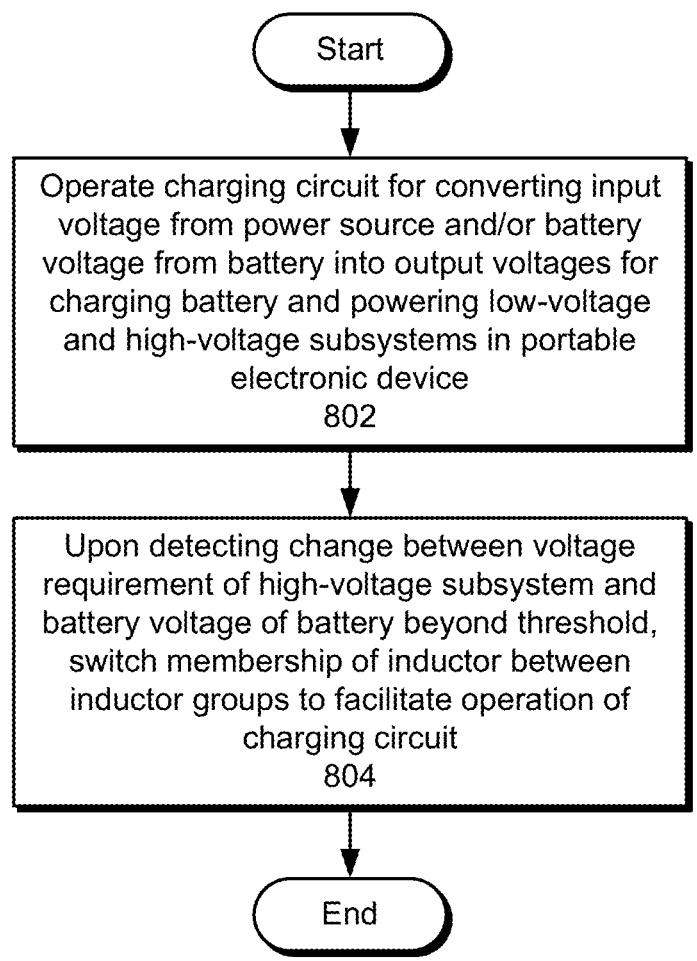
FIG. 8 shows a flowchart illustrating the process of managing use of a battery in a portable electronic device in accordance with the disclosed embodiments.

FIG. 8 shows a flowchart illustrating the process of managing use of a battery in a portable electronic device in accordance with the disclosed embodiments. In one or more embodiments, one or more of the steps may be omitted, repeated, and/or performed in a different order. Accordingly, the specific arrangement of steps shown in FIG. 8 should not be construed as limiting the scope of the embodiments.

Initially, a charging circuit for converting an input voltage from a power source and/or a battery voltage from a battery into a set of output voltages for charging the battery and powering a low-voltage subsystem and a high-voltage subsystem in the portable electronic device is operated (operation 802). The charging circuit may include two inductor groups, each of which includes one or more inductors. The operation of the charging circuit may include down-converting the input voltage, up-converting a target voltage of the battery, and/or up-converting a battery voltage of the battery.

Next, a membership of an inductor is switched between the inductor groups to facilitate operation of the charging circuit upon detecting a change between a voltage requirement of the high-voltage subsystem and a battery voltage of the battery beyond a threshold (operation 804). For example, the inductor may be switched between a first inductor group and a second inductor group to facilitate efficient charging of battery and/or boosting of the battery voltage to the voltage requirement of the high-voltage subsystem.

Figure 9:
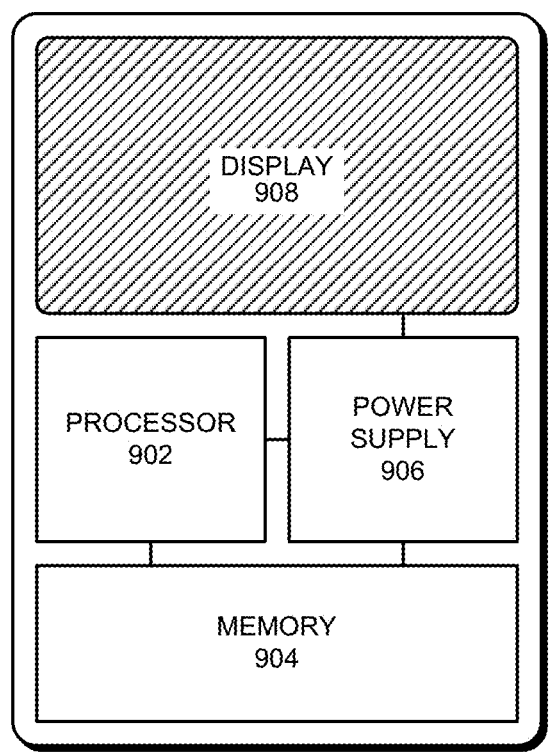
FIG. 9 shows a portable electronic device in accordance with the disclosed embodiments.

The above-described charging circuit can generally be used in any type of electronic device. For example, FIG. 9 illustrates a portable electronic device 900 which includes a processor 902, a memory 904 and a display 908, which are all powered by a power supply 906. Portable electronic device 900 may correspond to a laptop computer, tablet computer, mobile phone, portable media player, digital camera, and/or other type of battery-powered electronic device. Power supply 906 may include a switching converter such as the converter shown in FIG. 4A, a boost converter, an inverting converter, a Ćuk converter, a SEPIC, a Zeta converter, and/or a buck-boost converter. The switching converter may include a first inductor group and a second inductor group. Power supply 906 may also include a control circuit that uses the switching converter to convert an input voltage from a power source and/or a battery voltage from a battery in portable electronic device 900 into a set of output voltages for charging the battery and powering two or more subsystems in portable electronic device 900, including a low-voltage subsystem and a high-voltage subsystem. For example, the control circuit may use the first and second inductor groups to independently buck and/or boost the input voltage and/or battery voltage into a set of output voltages for charging the battery and powering the low-voltage subsystem and the high-voltage subsystem.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for managing use of a battery in a portable electronic device, comprising:
    operating a charging circuit for converting an input voltage from a power source into a set of output voltages to simultaneously charge the battery, power a low-voltage subsystem, and power a high-voltage subsystem in the portable electronic device; and
    during operation of the charging circuit, upon detecting the input voltage from the power source and a low-voltage state in the battery:
        using a first inductor group in the charging circuit to down-convert the input voltage to a target voltage of the battery that is lower than a voltage requirement of the high-voltage subsystem;
        using the target voltage to charge the battery and power the low-voltage subsystem; and
        using a second inductor group in the charging circuit to up-convert the target voltage to power the high-voltage subsystem; and
    upon detecting a change between a voltage requirement of the high-voltage subsystem and a battery voltage of the battery beyond a threshold, switching a membership of an inductor between the first and second inductor groups to facilitate operation of the charging circuit.

2. The method of claim 1, further comprising:
    upon detecting the input voltage from the power source and a high-voltage state in the battery, using the first and second inductor groups to:
        down-convert the input voltage to a target voltage of the battery; and
        charge the battery and power the low-voltage subsystem and the high-voltage subsystem from an input current of the power source.

3. The method of claim 2, further comprising:
    upon detecting the input voltage from the power source and a voltage state in the battery between the low-voltage state and the high-voltage state:
        using the first inductor group to down-convert the input voltage to the target voltage of the battery; and
        powering the high-voltage subsystem from at least one of:
            the up-converted target voltage from the second inductor group; and
            the target voltage from the first and second inductor groups.

4. The method of claim 1, further comprising:
    during discharge of the battery in the low-voltage state:
        using the second inductor group to up-convert a battery voltage of the battery to power the high-voltage subsystem; and
        using the charging circuit to directly power the low-voltage subsystem from the battery voltage.

5. The method of claim 4, further comprising:
    upon detecting coupling of an external load to the portable electronic device, using the first inductor group to up-convert the battery voltage to power the external load.

6. The method of claim 4, further comprising:
    during discharge of the battery between the low-voltage state and a high-voltage state, powering the high-voltage subsystem from at least one of:
        the up-converted battery voltage from the second inductor group; and
        the battery voltage along a bypass path to the high-voltage subsystem in the charging circuit.

7. The method of claim 1, wherein each of the first and second inductor groups comprises one or more inductors.

8. The method of claim 1, wherein the operation of the charging circuit comprises at least one of:
    down-converting the input voltage;
    up-converting a target voltage of the battery; and
    up-converting a battery voltage of the battery.

9. A charging system for a portable electronic device, comprising:
    a switching converter comprising a first inductor group and a second inductor group; and
    a control circuit configured to use the switching converter to convert an input voltage from a power source into a set of output voltages to simultaneously charge a battery in the portable electronic device, power a low-voltage subsystem, and power a high-voltage subsystem in the portable electronic device,
    wherein upon detecting the input voltage from the power source and a low-voltage state in the battery, the control circuit is further configured to:
        use the first inductor group to down-convert the input voltage to a target voltage of the battery that is lower than a voltage requirement of the high-voltage subsystem; and
        use the second inductor group to up-convert the target voltage to power the high-voltage subsystem; and
    wherein upon detecting a change between a voltage requirement of the high-voltage subsystem and a battery voltage of the battery beyond a threshold, the control circuit is further configured to:
        switch a membership of an inductor between the first and second inductor groups to facilitate operation of the charging system.

10. The charging system of claim 9, wherein upon detecting the input voltage from the power source and a high-voltage state in the battery, the control circuit is further configured to:
    use the first and second inductor groups to:
        down-convert the input voltage to a target voltage of the battery; and charge the battery and power the low-voltage subsystem and the high-voltage subsystem from an input current of the power source.

11. The charging system of claim 10, wherein upon detecting the input voltage from the power source and a voltage state in the battery between the low-voltage state and the high-voltage state, the control circuit is further configured to:
use the first inductor group to down-convert the input voltage to the target voltage of the battery; and
power the high-voltage subsystem from at least one of:
the up-converted target voltage from the second inductor group; and
the target voltage from the first and second inductor groups.

12. The charging system of claim 9, wherein during discharge of the battery in the low-voltage state, the control circuit is further configured to:
use the second inductor group to up-convert a battery voltage of the battery to power the high-voltage subsystem; and
directly power the low-voltage subsystem from the battery voltage.

13. The charging system of claim 12, wherein upon detecting coupling of an external load to the portable electronic device, the control circuit is further configured to:
use the first inductor group to up-convert the battery voltage to power the external load.

14. The charging system of claim 12, wherein during discharge of the battery between the low-voltage state and a high-voltage state, the control circuit is further configured to:
power the high-voltage subsystem from at least one of:
the up-converted battery voltage from the second inductor group; and
the battery voltage along a bypass path to the high-voltage subsystem.

15. A portable electronic device, comprising:
a first set of components in a high-voltage subsystem;
a second set of components in a low-voltage subsystem;
a battery;
a switching converter comprising a first inductor group and a second inductor group; and
a control circuit configured to use the switching converter to convert an input voltage from a power source into a set of output voltages to simultaneously charge the battery, power the low-voltage subsystem, and power the high-voltage sub system,
wherein upon detecting the input voltage from the power source and a low-voltage state in the battery, the control circuit is further configured to:
use the first inductor group to down-convert the input voltage to a target voltage of the battery that is lower than a voltage requirement of the high-voltage subsystem; and
use the second inductor group to up-convert the target voltage to power the high-voltage subsystem; and
wherein upon detecting a change between a voltage requirement of the high-voltage subsystem and a battery voltage of the battery beyond a threshold, the control circuit is further configured to:
switch a membership of an inductor between the first and second inductor groups to facilitate operation of the charging system.

16. The portable electronic device of claim 15, wherein upon detecting the input voltage from the power source and a high-voltage state in the battery, the control circuit is further configured to:
use the first and second inductor groups to:
down-convert the input voltage to a target voltage of the battery; and
charge the battery and power the low-voltage subsystem and the high-voltage subsystem from an input current of the power source.

17. The portable electronic device of claim 16, wherein upon detecting the input voltage from the power source and a voltage state in the battery between the low-voltage state and the high-voltage state, the control circuit is further configured to:
use the first inductor group to down-convert the input voltage to the target voltage of the battery; and
power the high-voltage subsystem from at least one of:
the up-converted target voltage from the second inductor group; and
the target voltage from the first and second inductor groups.

18. The portable electronic device of claim 15, wherein during discharge of the battery in the low-voltage state, the control circuit is further configured to:
use the second inductor group to up-convert a battery voltage of the battery to power the high-voltage subsystem; and
directly power the low-voltage subsystem from the battery voltage.

19. The portable electronic device of claim 18, wherein upon detecting coupling of an external load to the portable electronic device, the control circuit is further configured to:
use the first inductor group to up-convert the battery voltage to power the external load.

20. The portable electronic device of claim 18, wherein during discharge of the battery between the low-voltage state and a high-voltage state, the control circuit is further configured to:
power the high-voltage subsystem from at least one of:
the up-converted battery voltage from the second inductor group; and
the battery voltage along a bypass path to the high-voltage subsystem.

* * * * *